March 8, 1949.   J. H. GRUVER   2,463,690
PLATE HANDLING MECHANISM FOR EMBOSSING MACHINES
Filed Oct. 24, 1946   14 Sheets-Sheet 1

INVENTOR.
John H. Gruver
BY Wallace and Cannon
ATTORNEYS

March 8, 1949. J. H. GRUVER 2,463,690
PLATE HANDLING MECHANISM FOR EMBOSSING MACHINES
Filed Oct. 24, 1946 14 Sheets-Sheet 2
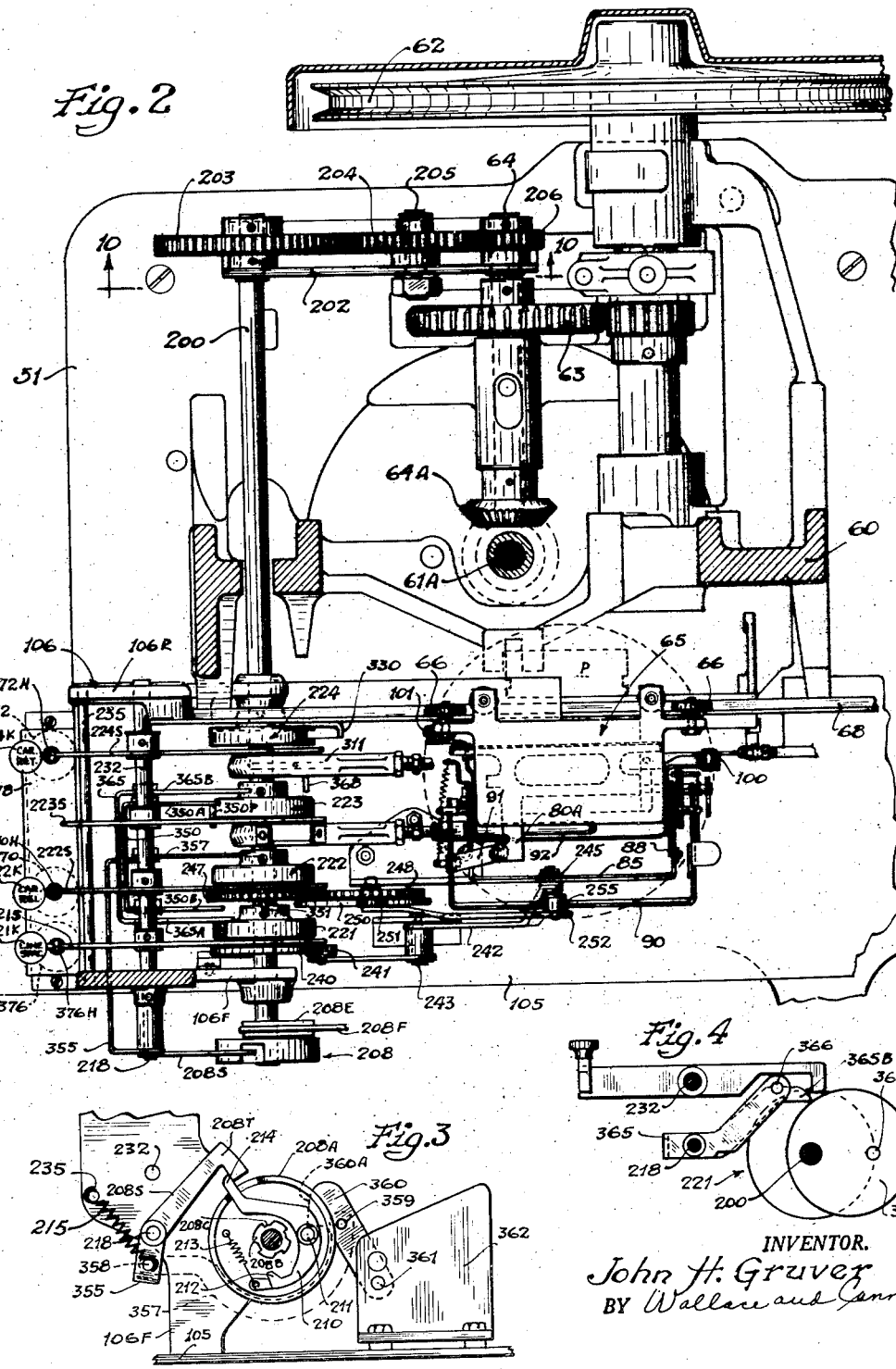
INVENTOR.
John H. Gruver
BY Wallace and Cannon
ATTORNEYS

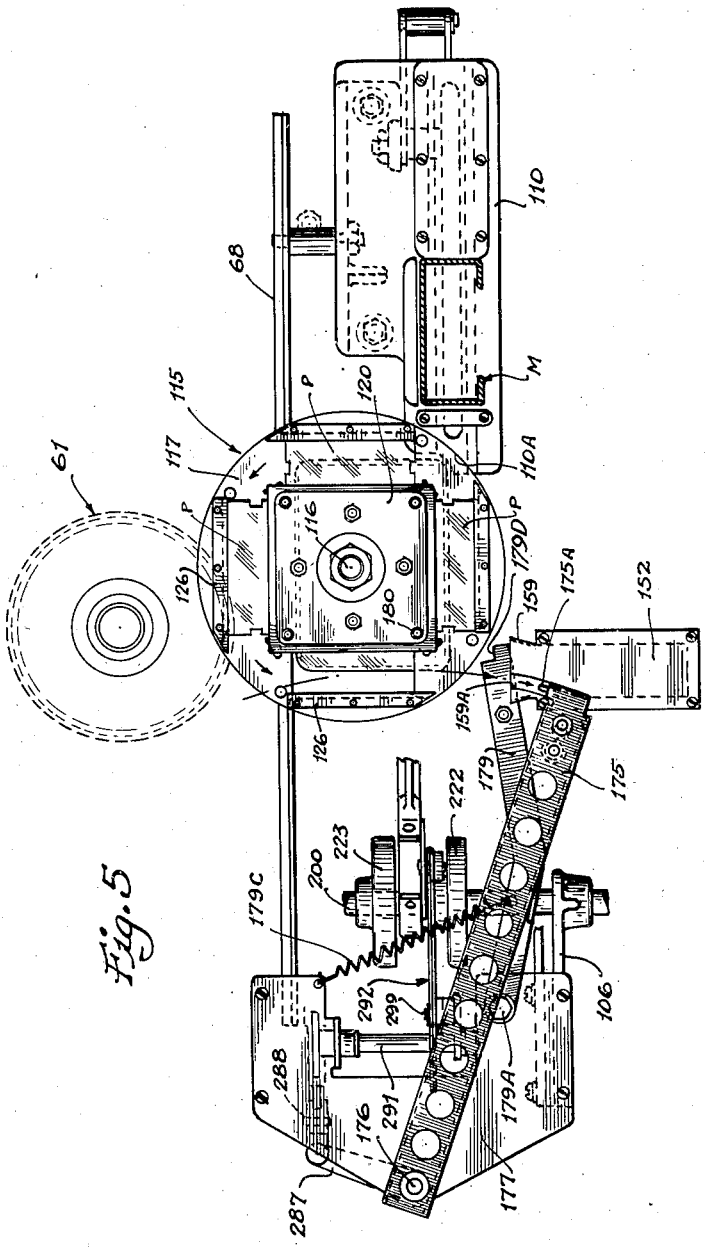

March 8, 1949.  J. H. GRUVER  2,463,690
PLATE HANDLING MECHANISM FOR EMBOSSING MACHINES
Filed Oct. 24, 1946  14 Sheets-Sheet 4
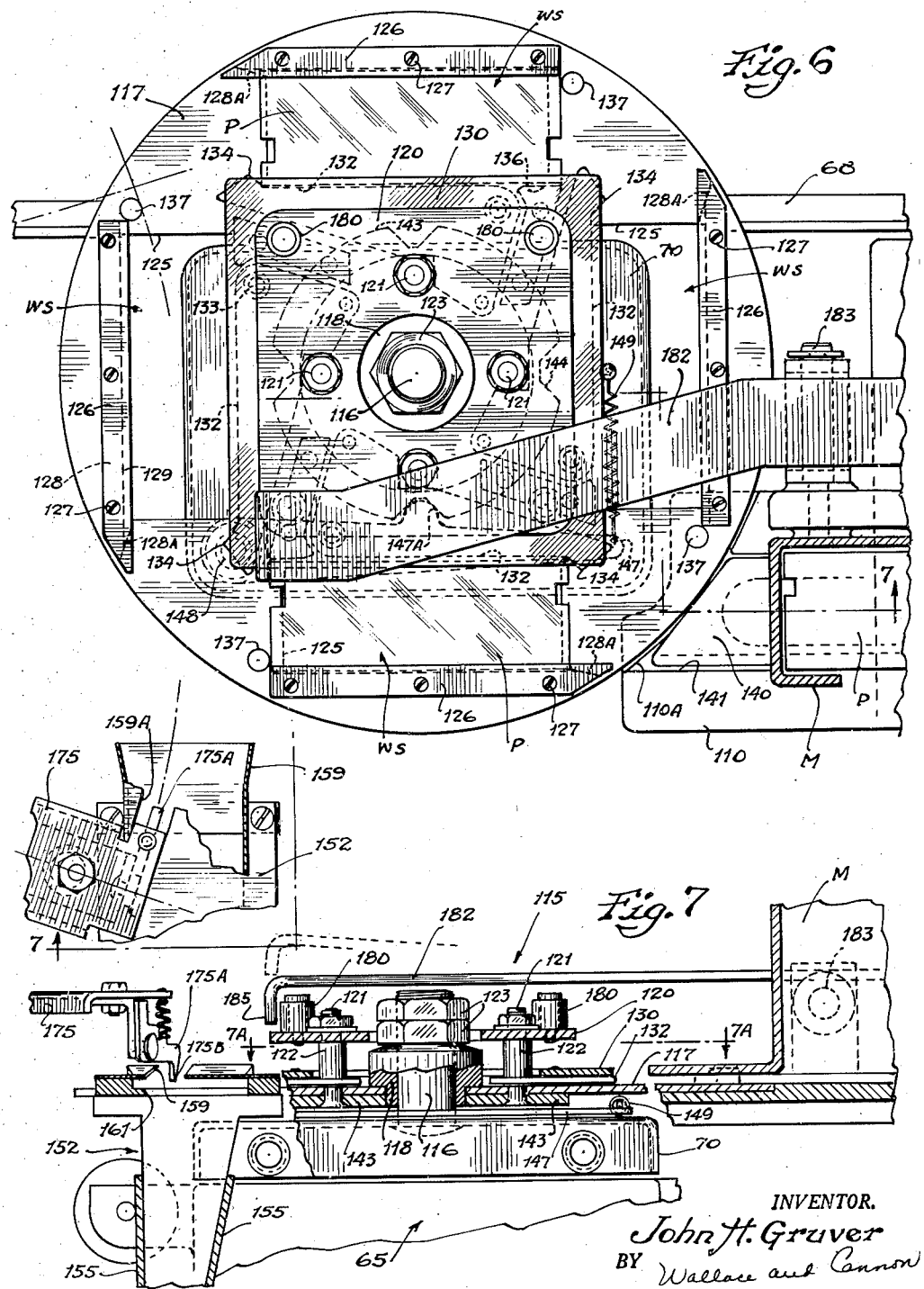
INVENTOR.
John H. Gruver
BY Wallace and Cannon
ATTORNEY March 8, 1949. J. H. GRUVER 2,463,690
PLATE HANDLING MECHANISM FOR EMBOSSING MACHINES
Filed Oct. 24, 1946 14 Sheets-Sheet 5
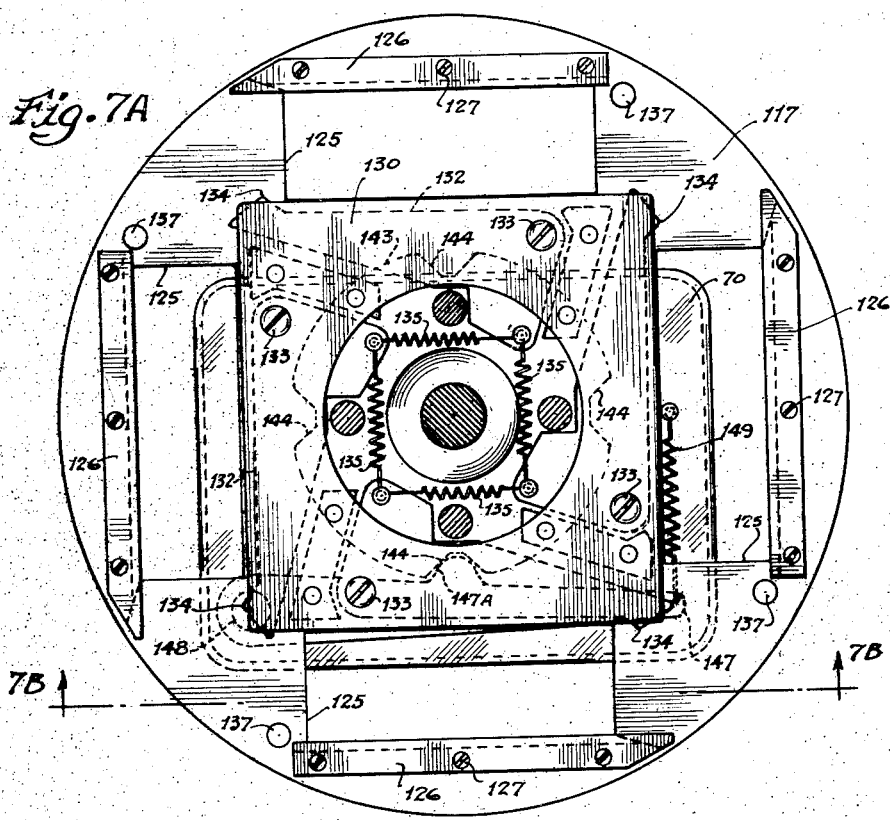
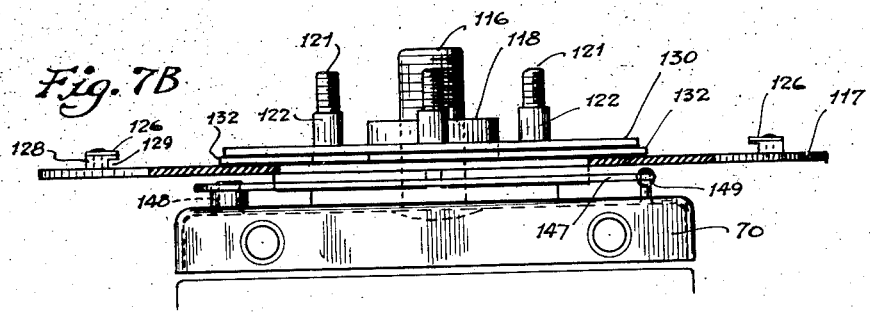
INVENTOR.
John H. Gruver
BY Wallace and Cannon
ATTORNEYS March 8, 1949.    J. H. GRUVER    2,463,690
PLATE HANDLING MECHANISM FOR EMBOSSING MACHINES
Filed Oct. 24, 1946    14 Sheets-Sheet 6

INVENTOR.
John H. Gruver
BY Wallace and Cannon
ATTORNEYS

March 8, 1949. J. H. GRUVER 2,463,690
PLATE HANDLING MECHANISM FOR EMBOSSING MACHINES
Filed Oct. 24, 1946 14 Sheets-Sheet 7
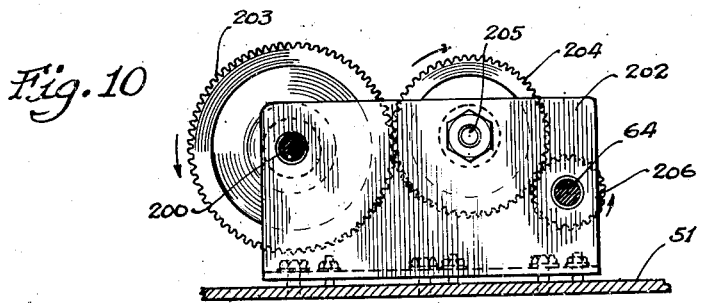
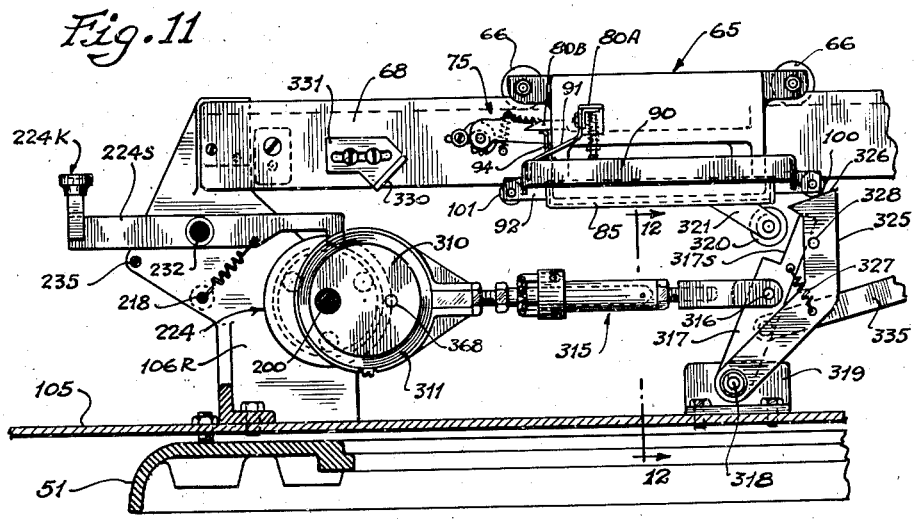
INVENTOR.
John H. Gruver
BY Wallace and Cannon
ATTORNEYS March 8, 1949. J. H. GRUVER 2,463,690
PLATE HANDLING MECHANISM FOR EMBOSSING MACHINES
Filed Oct. 24, 1946 14 Sheets-Sheet 8
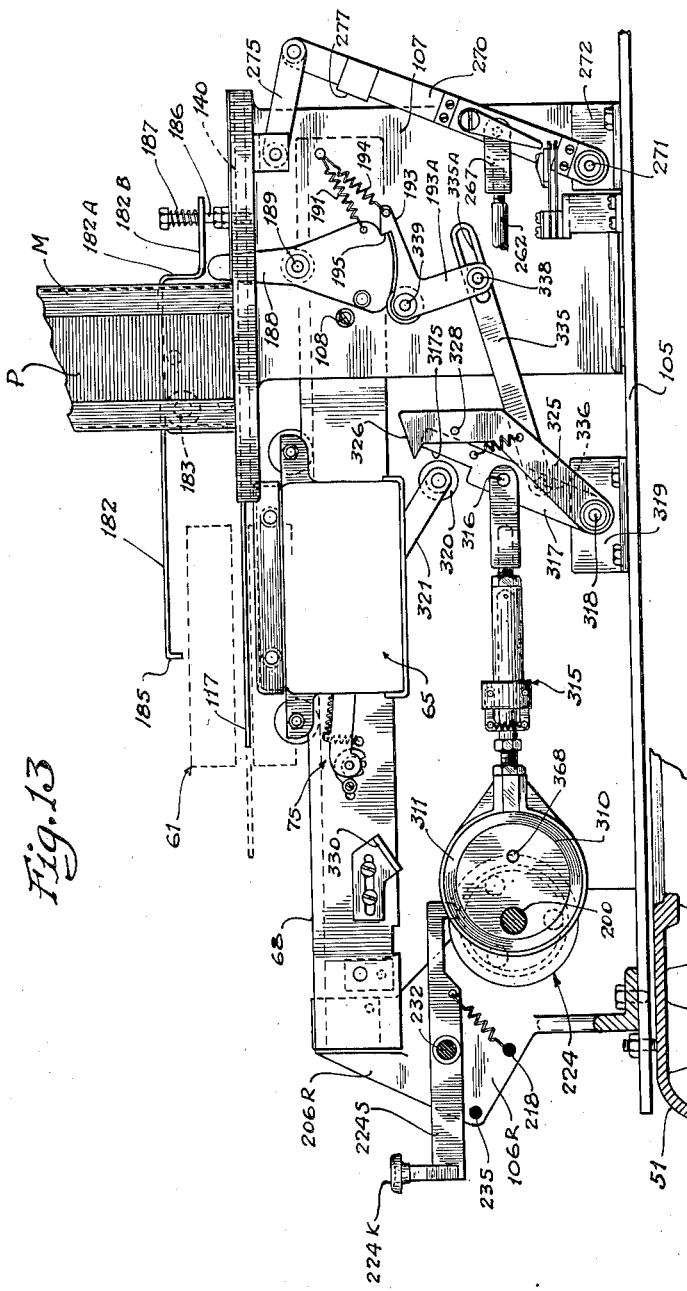
INVENTOR.
John H. Gruver
BY Wallace and Cannon
ATTORNEYS

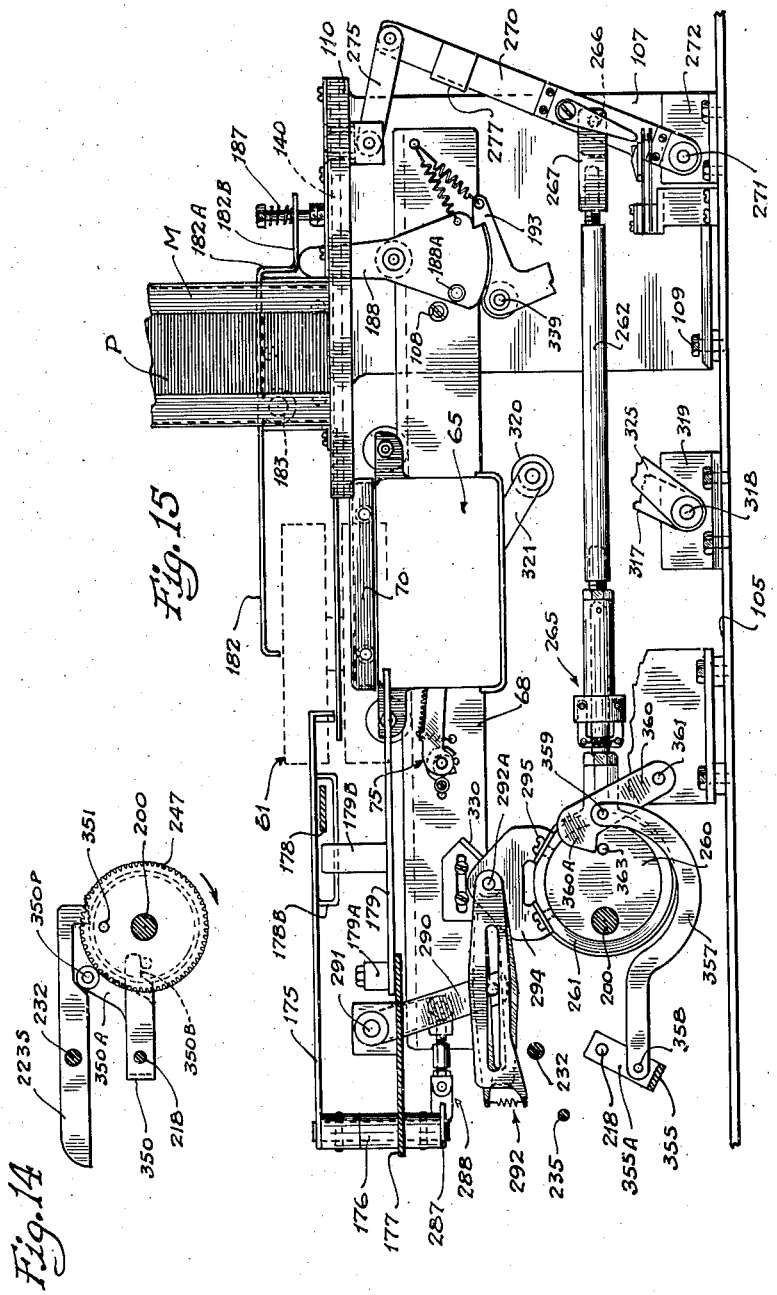

March 8, 1949. J. H. GRUVER 2,463,690
PLATE HANDLING MECHANISM FOR EMBOSSING MACHINES
Filed Oct. 24, 1946 14 Sheets-Sheet 10
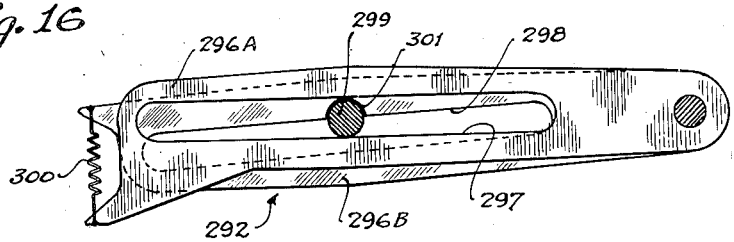
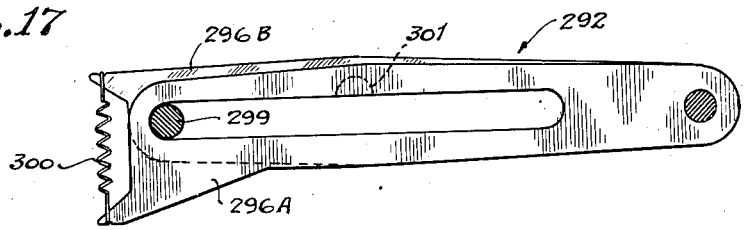
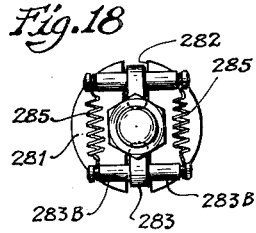
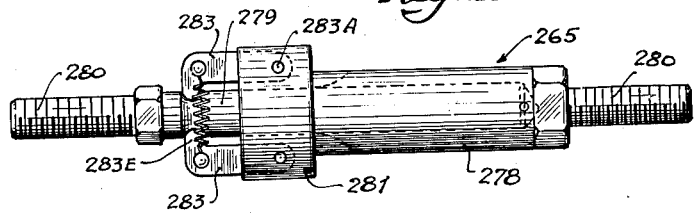
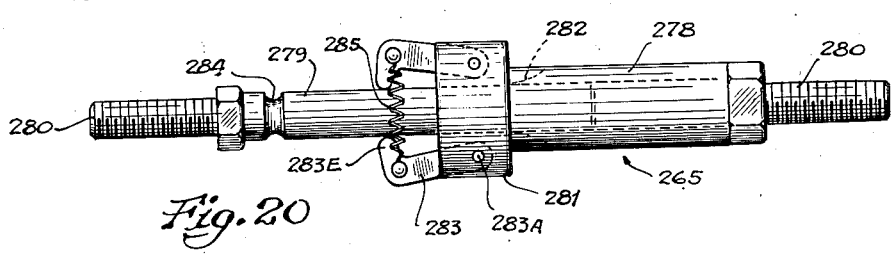
INVENTOR.
John H. Gruver
BY Wallace and Connor
ATTORNEYS March 8, 1949.  J. H. GRUVER  2,463,690
PLATE HANDLING MECHANISM FOR EMBOSSING MACHINES
Filed Oct. 24, 1946  14 Sheets-Sheet 11

INVENTOR.
John H. Gruver
BY Wallace and Cannon
ATTORNEYS

March 8, 1949. J. H. GRUVER 2,463,690
PLATE HANDLING MECHANISM FOR EMBOSSING MACHINES
Filed Oct. 24, 1946 14 Sheets-Sheet 12
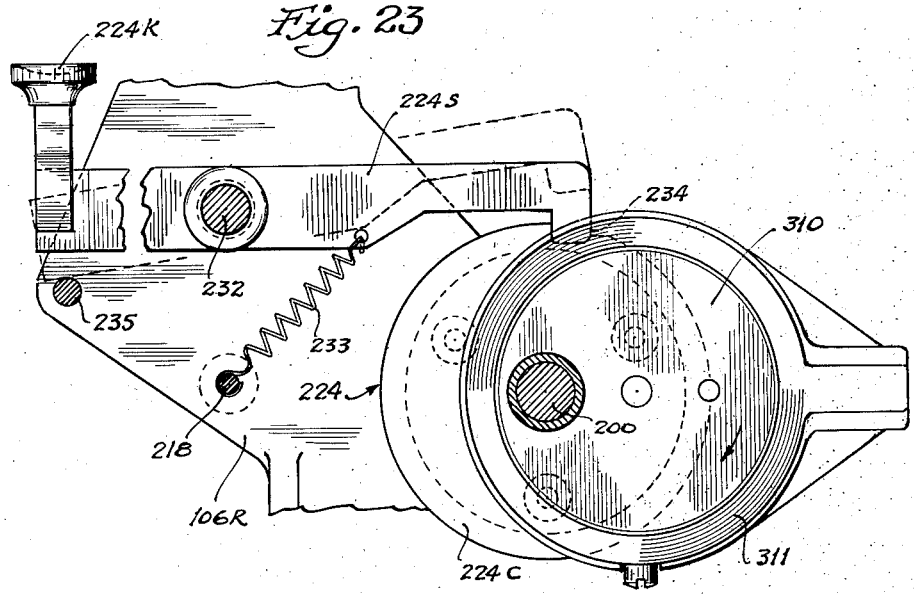
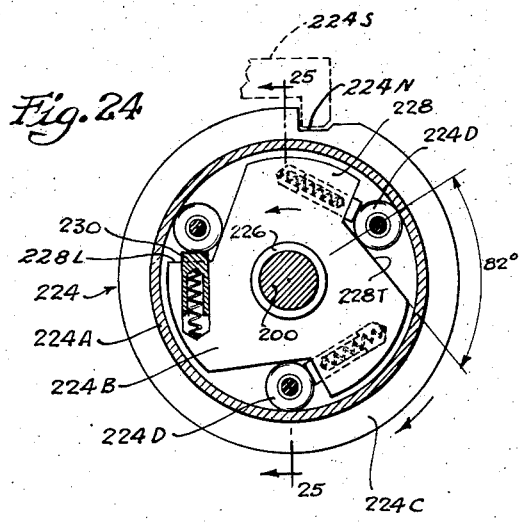
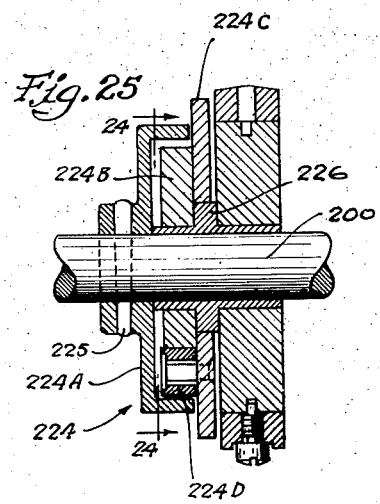
INVENTOR.
John H. Gruver
BY Wallace and Cannon
ATTORNEYS March 8, 1949. J. H. GRUVER 2,463,690
PLATE HANDLING MECHANISM FOR EMBOSSING MACHINES
Filed Oct. 24, 1946 14 Sheets-Sheet 13

INVENTOR.
John H. Gruver
BY Wallace and Cannon
ATTORNEYS

March 8, 1949. J. H. GRUVER 2,463,690
PLATE HANDLING MECHANISM FOR EMBOSSING MACHINES
Filed Oct. 24, 1946 14 Sheets-Sheet 14
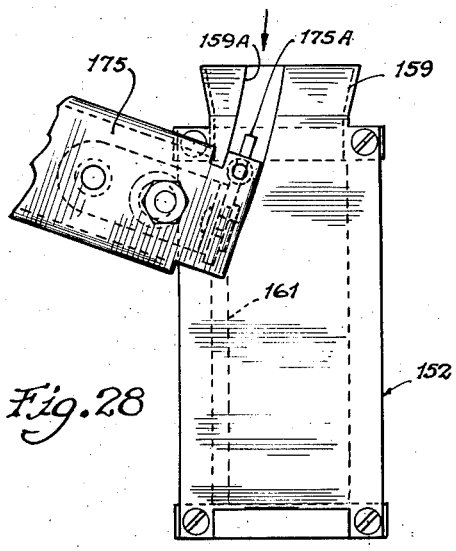
Fig.28
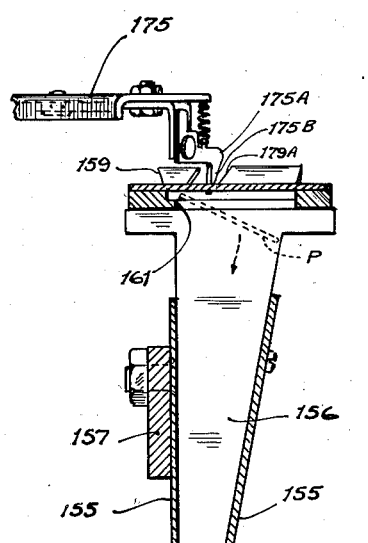
Fig.29
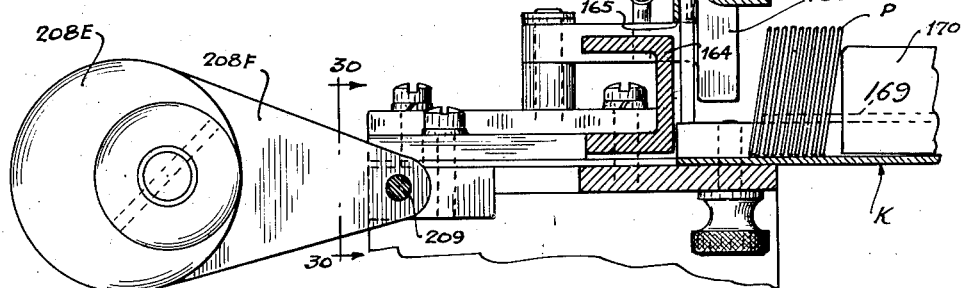
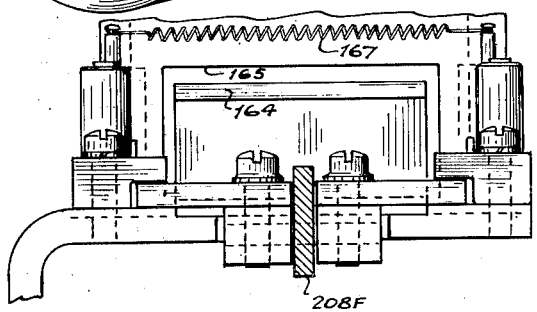
Fig.30
INVENTOR.
John H. Gruver
BY Wallace and Cannon
ATTORNEYS Patented Mar. 8, 1949

2,463,690

UNITED STATES PATENT OFFICE 2,463,690

PLATE HANDLING MECHANISM FOR EMBOSSING MACHINES

John H. Gruver, East Cleveland, Ohio, assignor to Addressograph-Multigraph Corporation, Wilmington, Del., a corporation of Delaware Application October 24, 1946, Serial No. 705,265

36 Claims. (Cl. 197—6.6)

This invention relates to embossing machines, and particularly to embossing machines of the kind that are adapted to emboss type characters on thin metal printing plates.

Embossing machines that are adapted to emboss type characters on thin metal printing plates are generally quite old, and in such machines a plurality of pairs of punches and dies are usually arranged for selective setting movement into an embossing position, and suitable means including a carriage are afforded for disposing a printing plate in such embossing position so that the selected punch and die may be operated to produce an embossed type character upon the printing plate. Provision is made in such machines for character spacing and line spacing of the printing plate with respect to the embossing position, and while the character spacing function is effected automatically in such machines, the line spacing is usually accomplished manually. An example of such an embossing machine will be found in the Duncan and Hubbard Patent No. 1,831,103, patented November 10, 1931, and an examination of such patent will disclose that the printing plates that are to be embossed in such a machine must be loaded and unloaded manually so that a considerable loss of time results from the manual loading and unloading operations as well as from the preliminary setting movements of the carriage that must be effected in order to bring the carriage into proper position for accomplishment of such loading and unloading operations. Such loss of time is of course objectionable, and it is an important object of the present invention to enable the printing plates to be quickly and easily loaded and unloaded by mechanical means in an embossing machine of the aforesaid character. It will also be evident that in embossing machines as heretofore used, the unloading and loading operations were in each instance performed successively, and this has also resulted in loss of operating time, and to eliminate this time consuming sequence of operation, and enable the unloading and loading of printing plates to be accomplished concurrently is another important object of this invention.

In machines of the character to which this invention relates it has heretofore been the custom to perform the required operations such as loading of the plate, the setting of the carriage in its initial or starting position by a carriage return movement, the various line spacing movements, and the carriage release and the plate unloading and loading operations in succession, and in most instances each such function or operation has been initiated manually and in some instances has been performed manually, and as a result of this relatively complicated sequence of manual operations, it has been impossible to obtain rapid operation and high production of such machines. It is therefore an important object of the present invention to enable such functions of an embossing machine to be successively and automatically performed where such functions are invariably related to each other, and further and related objects are to afford power-driven means for accomplishing the aforesaid functions, and to enable such power-driven means to be operated by control means which enable such functions to be performed as early as possible in each machine cycle.

A further object of the present invention is to enable a plurality of mounting positions to be afforded for printing plates on the carriage of such an embossing machine so that a plurality of printing plates may be mounted upon such a carriage, and a related object is to dispose such mounting positions at spaced points on a moveable workholder so that printing plates carried on the workholder may be moved into an embossing position on the carriage in succession. A further and related object is to enable an indexing work-supporting head or holder to be utilized in an embossing machine of the character to which this invention relates, and to enable loading and unloading operations to be performed at different points about the periphery of such indexing workholder so as to thereby enable the loading and unloading operations to be performed concurrently.

Objects related to the foregoing are to afford control means for indexing such workholders after the loading and unloading operations have been performed, and to relate such indexing means to the plate feeding mechanism which feeds the printing plates into position on the indexing workholder.

Further objects of the invention are to enable power operated plate handling and carriage control mechanism in such an embossing machine to be so constructed and arranged that either manual or automatic control of such mechanism may be readily accomplished, and to embody such mechanism as a unit that is adapted to be mounted on or removed bodily from the frame of an embossing machine without disturbance of the critical adjusted relationships of the various plate handling and carriage control mechanisms.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 2 is a plan view taken partially in section and illustrating the actuating and control mechanism employed in the embossing machine of Fig. 1;

Fig. 3 is a fragmental front elevational view illustrating one of the control clutches and the means whereby this clutch is governed;

Fig. 4 is a vertical sectional view illustrating the manner in which other clutches of the mechanism are interrelated;

Fig. 5 is a fragmentary plan view illustrating the plate feeding and ejecting means and the relationship of such means to the workholding turret;

Fig. 6 is an enlarged fragmental plan view showing further details of the turret upon which the printing plates are mounted;

Fig. 7 is a vertical sectional view taken substantially along the line 7—7 of Fig. 6;

Fig. 7A is a plan sectional view taken substantially along the line 7A—7A of Fig. 7 and illustrating further details of the turret;

Fig. 7B is a vertical sectional view taken substantially along the line 7B—7B of Fig. 7A;

Fig. 10 is a fragmentary vertical sectional view taken substantially along the line 10—10 of Fig. 2;

Fig. 11 is a fragmentary vertical sectional view illustrating the carriage return mechanism of the machine;

Fig. 12 is a vertical sectional view taken substantially along the line 12—12 in Fig. 11;

Fig. 13 is a fragmentary vertical elevational view illustrating the interrelationship between the carriage return mechanism and the plate feeding mechanism in attaining indexing movement of the workholding turret;

Fig. 14 is a fragmentary front elevational view illustrating the controlling connection between certain of the operating clutches;

Fig. 15 is a view similar to Fig. 13 and showing other details of construction including the drive for the plate ejecting mechanism;

Fig. 16 and 17 are elevational views illustrating the details of one form of overload release mechanism employed in the machine;

Fig. 18 is an elevational view of another form of overload release mechanism employed in the machine;

Figs. 19 and 20 are side elevational views of the overload release mechanism of Fig. 18 and showing the parts thereof in different positions;

Fig. 23 is a vertical sectional view illustrating the form of one of the clutches;

Fig. 24 is a vertical sectional view taken substantially along the line 24—24 of Fig. 25;

Fig. 25 is a sectional view taken substantially along the line 25—25 of Fig. 24;

Fig. 28 is a plan view of the plate ejecting mechanism and the collecting chute;

Fig. 29 is a vertical sectional view showing the relationship of the plate ejector chute and the packer mechanism; and Fig. 30 is a vertical sectional view taken substantially along the line 30—30 of Fig. 29.

Figure 1:
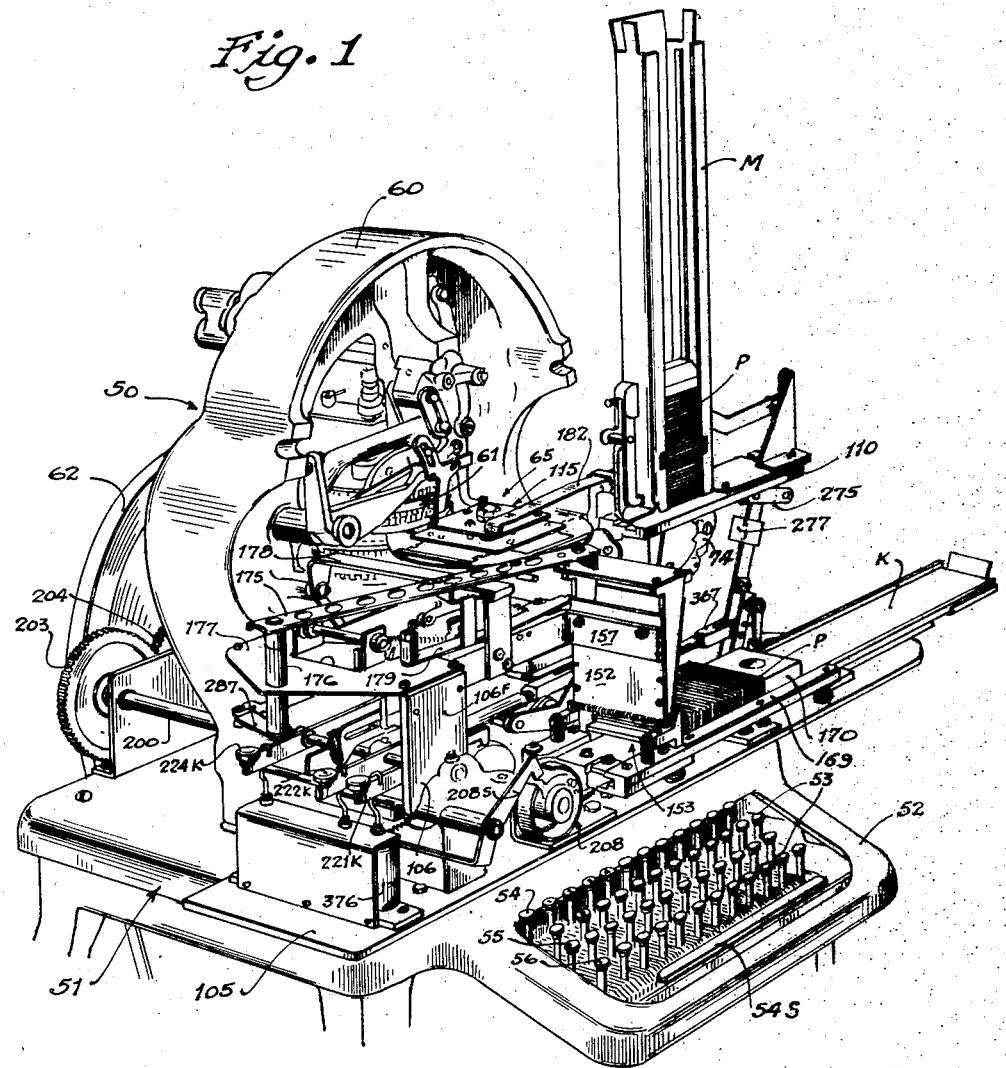
Fig. 1 is a perspective view of an embossing machine embodying the features of the invention.

For purposes of disclosure the invention is herein illustrated as embodied in an embossing machine 50 of the general character disclosed in the aforesaid Duncan and Hubbard patent, and under and in accordance with the present invention, means are embodied in the embossing machine 50 for automatically feeding printing plates P from a magazine M and into position for the performance of the desired embossing operations thereon, and after the embossing operations have been completed the printing plates P are automatically discharged from the machine and are packed in a collecting magazine K, as shown in Fig. 1 of the drawings. The embossing machine 50, as shown in Fig. 1 of the drawings, embodies an upstanding frame 51 along the forward edge of which a keyboard 52 is provided, and this keyboard has a plurality of keys 53 and a space bar 54S for controlling operation of the machine in the manner disclosed in the aforesaid Duncan and Hubbard patent. In addition to the keys 53, the present machine also affords a plurality of keys 54, 55, and 56 along one end edge of the keyboard whereby special operations or functions of the machine may be controlled by the operator as will hereinafter be explained in detail.

The embossing machine 50 embodies an upstanding frame 60, Figs. 1 and 2, that is of inverted generally U-shaped form, and within this frame there is mounted a rotatable die head structure 61 that is constantly rotated in a predetermined direction on a vertical shaft 61A, Fig. 2, and this die head structure embodies opposed pairs of punches and dies which may be operated or moved toward each other so as to form an embossed type character on a printing plate P that is supported in embossing position between such selected pair of punches and dies. The rotating die head structure 61 is constantly driven through a friction clutch as explained in the aforesaid Duncan and Hubbard patent, and this is accomplished through means including a flywheel 62, gearing 63, a shaft 64, and gearing 64A, Fig. 2, and when a particular pair of punches and dies is to be selected, a selected one of an annular series of stops is rendered effective through operation of the appropriate one of the keys 53, and when this is done the stop is effective to bring the die head 61 to rest with the selected punch and die pair in the embossing position. The stop mechanism that is thus utilized for controlling the position of the die head 61 is preferably of the character disclosed in my co-pending application Serial No. 689,986, filed August 12, 1946, now Patent No. 2,444,292, dated June 29, 1948. As explained in the aforesaid Duncan and Hubbard patent as well as in my aforesaid copending application, the stopping of the die head 61 in a selected position is effective to institute operation of the embossing means, and upon the completion of the action of the embossing means, the mechanism is effective to cause an automatic character spacing movement of the carriage upon which the printing plate P is mounted and to restore the stop mechanism and the actuated key, and these aspects and features of the machine shown in the aforesaid Duncan and Hubbard patent are utilized in the present machine.

Under the present invention, however, the machine is provided with a different form of carriage, and this carriage is identified in Figs. 2, 5, 6, 7, 11, 13, 14, 21 and 22 as the carriage 65, and the carriage 65 as herein shown is basically of the same general character as the carriage construction illustrated in my copending application Serial No. 710,269, filed November 16, 1946, now Patent No. 2,450,725, dated October 5, 1948. The carriage 65 is supported and guided by means including rollers 66 upon a supporting rail 68 that is extended across the forward face of the machine and is secured to the frame 60 as is disclosed in the aforesaid Duncan and Hubbard patent. The carriage 65 has a cross slide 70 mounted thereon for line spacing movement in a horizontal direction and transversely with respect to the path of movement of the carriage 65 and, as disclosed in my aforesaid copending application Serial No. 710,269, the carriage 65 has a cross slide 70 that is constantly urged in a forward or return direction by spring means and is actuated through line spacing movements in a rearward direction by means including an operating rocker 71, and an actuating pawl 71A carried thereby. The cross slide 70 is releasably held in any adjusted line spacing position by means including a retaining pawl 72A. The carriage 65 is urged in a character spacing or right hand direction by means including a spring drum 74, Fig. 1, this spring drum being of the general character shown in the aforesaid Duncan and Hubbard patent, and the character spacing movements of the carriage under the biasing action of the spring drum 74 are controlled by an escapement mechanism 75 that cooperates with a character spacing rack 76 mounted on the carriage 65 as disclosed in my aforesaid copending application Serial No. 710,269. The escapement mechanism 75 includes two pawls that are operated to produce a character spacing movement of the carriage by means including a line spacing rod 78 that is generally similar to the line spacing rod utilized in the aforesaid Duncan and Hubbard patent. The escapement mechanism includes one pawl that is normally engaged with the rack 76, and when the carriage 65 is to be moved for setting purposes, this pawl may be disengaged through the medium of a rocking lever 80 that has its rear end underlying a roller 75A on the normally engaged pawl, as at 80A beyond the forward face of the carriage 65. The operation of the escapement mechanism, and of the escapement release lever 80 are described in detail in my copending application Serial No. 710,269.

Figure 22:
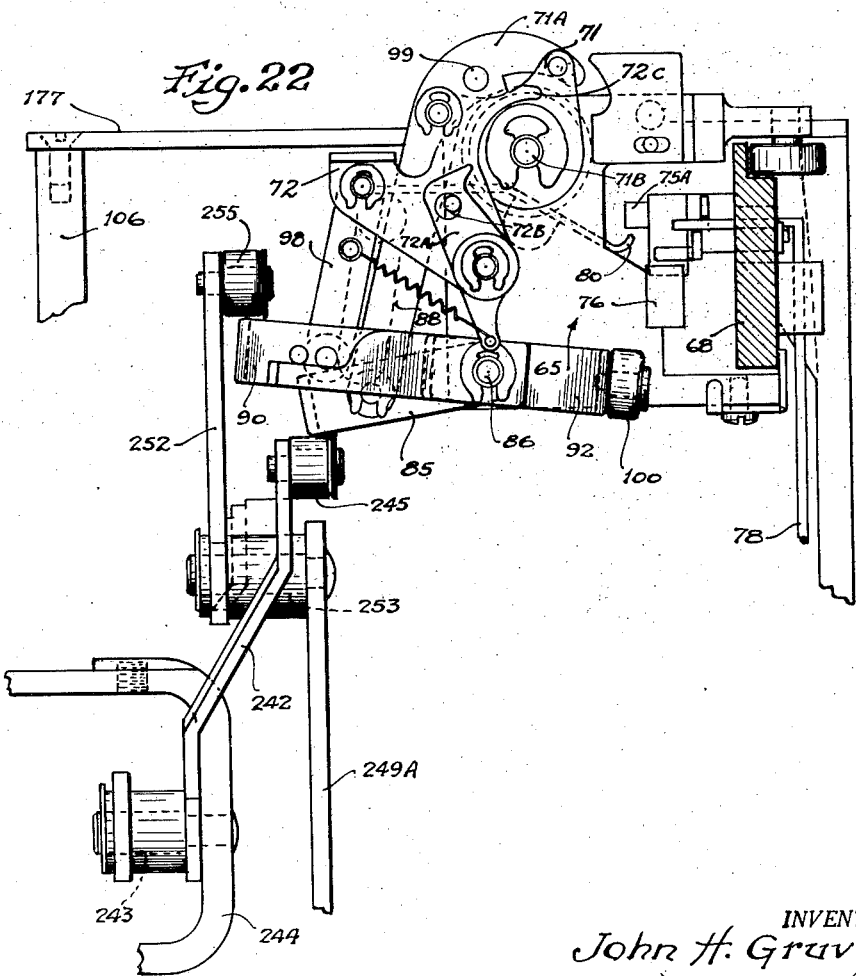
Fig. 22 is an end elevational view of the right hand end of the carriage.

When the carriage 65 is to be utilized in a machine of the character herein shown, the basic mechanism illustrated in my aforesaid copending application Serial No. 710,269 is modified so as to enable automatic operation thereof to be attained, and for this purpose a line spacing bail 85 is pivotally mounted on bearing pins 86 that are extended from opposite ends of the carriage 65, and a link 88 is extended upwardly from the bail 85, at the right hand end thereof, Fig. 22, and is connected with the actuating rocker 71 which operates the pawl 71A to impart line spacing movements to the cross slide 70. The operation of the line spacing mechanism to attain a line spacing movement is effected by upward movement of the line spacing bail 85, and when the rotary shaft 71B of the line spacing means has reached its new position, it is held in this position by the retaining pawl 72A.

The carriage 65 is also provided with a carriage release bail 90 that is pivoted on the pins 86, and a link 91 is extended upwardly from the left hand side portion of the bail 90 and is pivoted to the outer end 80A of the escapement release lever 80 so that when the bail 90 is rocked in a downward direction, the carriage escapement will be released so as to thereby enable the carriage 65 to return in a right hand direction under the influence of the spring drum 74 to a loading position in which it is illustrated in Fig. 5 of the drawings.

The carriage release bail 90 is also utilized to release the cross slide 70 for return movement to a forward or loading position, and this is accomplished by operation of a release rocker 72 with which the retaining pawl 72A is associated. Thus a link 98 connects the bail 90 with the rocker 72, and when the bail 90 is rocked downwardly, a tail portion 72C on the rocker 72 engages a pin 99 on the pawl 71A, thereby to shift the pawl 71A to a released position. At this same time, the rocking movement of the rocker 72 acts through a pin and slot connection 72B to withdraw the pawl 72A to a released position so as to thereby free the cross slide 70 for forward movement under the influence of its biasing spring.

Figure 21:
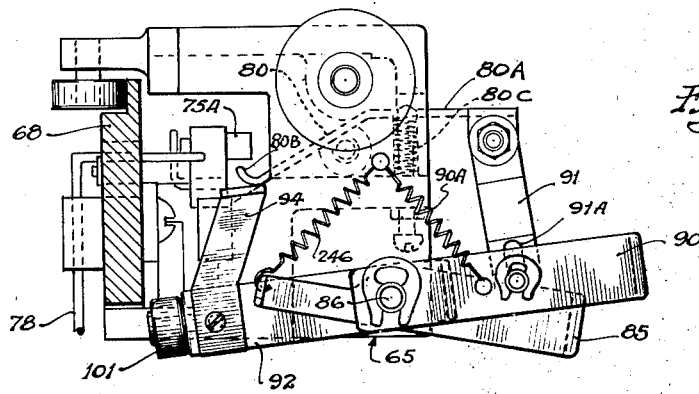
Fig. 21 is an end elevational view of the left hand end of the carriage.

Inwardly of the bail 85, a third bail 92 is provided which is mounted on the pins 86, and the arms of the bail 92 are extended rearwardly beyond the pivot pins 86, and the right hand arm of the bail 92 has an operating roller 100 thereon that is utilized in an automatic carriage return operation of the mechanism to release the escapement 75 while the carriage 65 is being returned to its left hand position. As the rear end of the left hand arm of the bail 92 a roller 101 is mounted as shown in Figs. 2 and 21, and this roller is utilized, as will hereinafter be described, in effecting automatic restoring of the escapement mechanism 75 when the carriage return movement has been completed.

As will be evident in Fig. 2, and in my aforesaid copending application Serial No. 710,269, the inner or rear end of the escapement release lever 80 is elongated in a direction parallel to the rail 68 so as to underlie the roller 75A in all normal positions of the carriage 65, and this inner end of the lever 80 has its left hand end extending outwardly at 80B over the left hand arm of the bail 92. The left hand arm of the bail 92 has an upstanding bar 94 fixed thereon which engages the lower face of the end 80B, and hence by upward rocking of the roller 100, the bar 94 is effective to release the escapement. A spring 80C acting on the lever 80 serves to hold the lever 80 and the bail 92 in the position shown in Fig. 21. It will be evident that the bail 92 will need to be operated in certain cycles of the machine to release the escapement 75 without releasing the cross slide 70, and to enable this to be done, the lower end of the link 91 is connected to the bail 90 by means of a slot 91A, Fig. 21.

Under and in accordance with the present invention the various mechanisms for handling and shifting the printing plates P are mounted upon a unitary structure that may be put in place upon or removed from the frame of the embossing machine as a unit, thereby to enable these operations to be performed without disturbing the critical adjustments and relationships of the several mechanisms of the unit. To this end a base plate 105 is provided for the plate handling unit which may rest upon the frame of the machine just rearwardly of the keyboard, and this plate 105 is rigidly associated with the rail 68 by means of brackets 106 and 107 disposed at opposite ends of the plate 105, as shown in Fig. 5. Thus the bracket 106 at the left hand end of the plate 105 has an upstanding portion 106R at its rear end which is rigidly secured to the left hand end portion of the rail 68. The bracket 107 is U-shaped in form so that one arm portion thereof may be secured to the top of the base plate 105 near the right hand end thereof, and the bottom of the U extends upwardly adjacent to the rear edge of the plate 105 and is rigidly secured by screws 108 to the right hand end portion of the rail 68. Thus the upper arm of the U-shaped bracket 107 extends forwardly and affords a base plate 110 upon which the magazine M is supported.

The present invention also provides for the support of a plurality of printing plates P on the cross slide 70, thereby to enable the plate loading and plate ejecting operations to be performed concurrently, and to this end an indexing turret 115 is mounted on a vertical stud 116 disposed centrally of the cross slide 70. The turret 115 includes a relatively large circular plate 117 having a central bearing sleeve 118 that surrounds the stud 116, and an upper actuating plate 120 of square form, is supported on and above the plate 117 by studs 121 for purposes that will appear hereinafter. A pair of nuts 123 on the stud 116, Fig. 6, hold the turret 115 in position on the cross slide.

About the periphery of the circular plate 117, a plurality of work supporting stations WS are afforded so that printing plates P may be supported in any one of such work supporting stations. In the present instance, the work supporting plate 117 has four work supporting stations WS formed thereabout at equally spaced locations, and each such position is defined in part by a rectangular opening 125, the long edges of which are perpendicular to the radius that passes through or across the central portion of such opening from the center of the mounting stud 116, as shown in Figs. 6 and 7. Along the outer edge of each opening 125, a retaining plate 126 is secured by rivets 127 to the top of a spacer plate 128, thereby to form a groove 129 in which one edge of a printing plate P may be disposed. Along the inner edge of each of the openings 125, a similar groove for the opposite edge of the printing plate P is afforded, and this is accomplished by means of a square plate 130 that is spaced upwardly from the plate 117 in the same amount as the plates 126. Beneath each edge of the plate 130, an elongated retaining pawl 132 is pivotally mounted, each such pawl 132 being pivoted as at 133 near one end of the opening 125 with which it is associated. The other end of each pawl is provided with a tooth 134 that projects into the groove that is formed between the plate 130 and the plate 117, and the tooth 134 in each instance has sloping edge surfaces on each side thereof. Thus a printing plate may be moved into the end of the grooves beneath the plates 126 and 130 and past the tooth 134, such tooth being normally urged outwardly of said groove to the position shown in Fig. 6 by means of a spring 135. It will be observed that the plate 130 is spaced from the plate 117 by means of spacer plates 136 that are disposed adjacent to the several corners of the plate 130. When a printing plate P has been moved endwise into position over one of the openings 125, it comes to rest with its leading end edge in engagement with a stop pin 137 and when that position has been reached, the tooth 134 moves back into the grooves so as to thereby engage the trailing end edge of the plate P and hold the same yieldingly in position over the opening 125. To facilitate the inserting movement that is thus required, the end edge of the spacer plate 128 that is adjacent to the tooth 134 is beveled as indicated at 128a.

The angular surface on the other side of the tooth 134A at each work supporting station comes into play in the ejection of a completed printing plate P from the work supporting station, and in this regard it will be observed that the plate is moved endwise away from the stop pin 137 so as to cam the tooth 134 out of the retaining groove, thereby to permit endwise ejection of the completed plate P.

When the carriage 65 is in its right hand or loading position shown in Figs. 5 and 6, the forward one of the work supporting stations of the turret is disposed opposite to and in alignment with the discharge side of the magazine M so that the lowermost printing plate in the magazine may be moved endwise out of the magazine and into position in this most forward work supporting station of the turret. Thus as will be evident in Figs. 1, 5, 6, 7, 13 and 15, the base plate 110 that supports the magazine M has an arcuately cut away corner 110A at its left hand rearward side so that the arcuate adjacent edge of the turret 115 may move into the position shown in Fig. 6. The supporting plate 110 is in turn provided with a plate feeding slide 140 that is reciprocable beneath the bottom of the magazine M through a guideway 141, Fig. 6, and onto the top of the plate 117, and in such movement the forward end edges of the plate P engage the surfaces 128A and the tooth 134 so as to move into position under the retaining plates and over the opening 125.

A printing plate P that is thus loaded onto the turret 115 at the forward edge of the turret is advanced into embossing position by rotative movement of the turret, and means are afforded for accurately locating the turret 115 in any one of four indexed positions. Thus as will be evident in Figs. 6 and 7, the plate 117 has an annular ring 143 secured on the lower face thereof by means including the bolts 121, and this ring has tapered or angular notches 144 formed therein at spaced points. The notches 144 are disposed at 90° intervals, and a spring pressed positioning pawl 147 is pivoted on the cross slide 70 at 148 so that a tooth 147A on the pawl 147 may be engaged with any aligned one of the notches 144. A spring 149 acts on the opposite end of the pawl 147 to urge the pawl 147 into its effective position, and when turning forces are applied to the turret, the pawl 147 is cammed outwardly while the indexing movement is being accomplished, and at the end of a 90° index movement the tooth 147 moves into position in the next notch 144, thereby to dispose the turret 115 so that the plate P carried at the rear work supporting position of the turret is accurately disposed in embossing position. Thus it will be clear that when a printing plate has been loaded onto the turret 115 at the forward work supporting position thereof, the next indexing movement of the turret in a counterclockwise direction, Fig. 6, will dispose this particular plate in the right hand work supporting position of Fig. 6, and this particular printing plate will not be moved into the embossing position until the next indexing movement of the turret 115.

Figure 27:
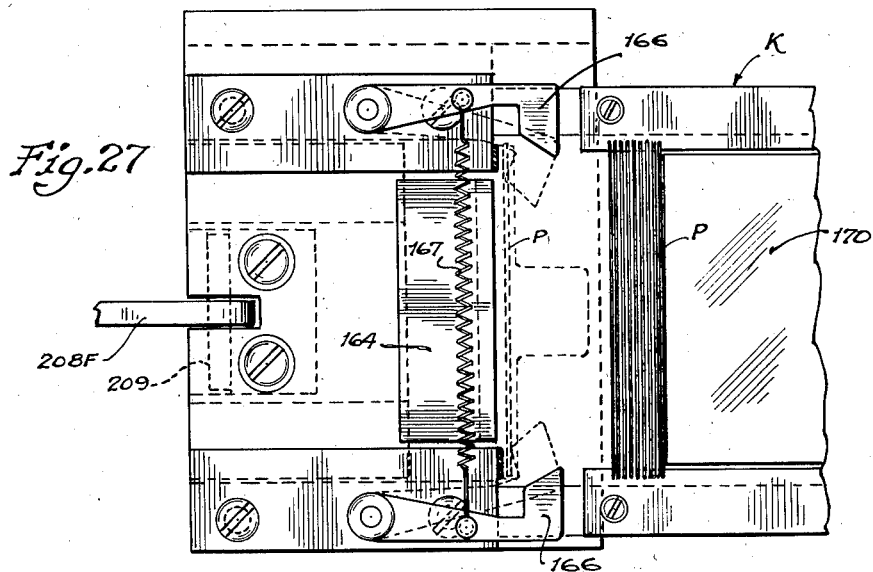
Fig. 27 is a plan view of the packer mechanism which collects the finished printing plates.

After completion of the required embossing operation upon a plate P in the embossing position, this plate is moved by a further indexing movement of the turret to a left hand position, Fig. 6, which constitutes an ejecting position, and after the turret has positioned a finished plate in this ejecting position, means are rendered effective for ejecting the finished plate from the turret 115. This is accomplished by moving the completed printing plate endwise in a forward direction, that is away from the stop pin 137, and in such ejecting movement the completed printing plate P is moved into a discharge chute 152 so that the printing plate may drop downwardly into an operative relationship with respect to a packer mechanism 153 that is associated with the collecting means K as will hereinafter be described. Thus the chute 152 is afforded by a pair of spaced plates 155 that diverge in an upward direction and are connected together by end walls 156. A bracket 157 extends to the left, Fig. 1, from the bracket 156 and serves to support the chute 152 with the upper end thereof disposed in substantial alignment with the left hand work supporting station of the turret 115, and the chute 152 has a cover plate 158 associated therewith on which an entry throat 159, Fig. 6, is provided. This entry throat is somewhat flared so as to insure entry of the leading end of a printing plate as it is discharged forwardly from the ejecting position of the turret, and the lower wall of the entry throat 159 terminates in an edge 159A, Fig. 6, at which point the falling movement of the printing plate down the chute 152 is to take place. Moreover, the left hand wall 155 of the chute 152 has a horizontal ledge 161 extended therealong and extending to the right so that when a plate is moved endwise through the throat 159 and into the chute 152, the left hand edge of the plate P will be continuously supported and hence when the trailing edge of the plate P moves off of the edge 159A, the right hand side edge of the plate P will then be unsupported and will tend to fall in a downward direction into the chute 152. Thus the printing plate falls edgewise through the chute and comes to rest upon a packing slide 164 that extends into and is slidable through an opening 165 formed through the walls 155 of the chute. When a plate P drops downwardly onto the slide 164, it is disposed somewhat above the slot 165 and is thus supported substantially in a vertical position. In the course of a packing movement, the slide 164 is withdrawn to the left, Fig. 30, by means that will be hereinafter described, and when this occurs, the plate P drops downwardly just to the right of the right hand end of the slide 164. The slide 164 thus holds the plate against tipping to the left, Fig. 30, and a pair of spring retaining arms 166 are disposed against the right hand surfaces of the plate to prevent tipping thereof in a right hand direction. The movement of the slide 164 is thereupon reversed and the plate is forced to the right, Figs. 27 and 30 to thereby separate the arms 166 against the action of a spring 167, and when this is done, the plate is moved into position in contact with the previously discharged printing plate. In this respect it should be pointed out that slots in the ends of the plate P are in such a packing movement moved into embracing relation with respect to guide rails 169 that are afforded along the side edges of the collector K. A sliding weight 170 disposed in the collector K holds the group of plates in a substantially vertical position and serves yieldingly to oppose the packing movement of the slide 164.

Figure 26:
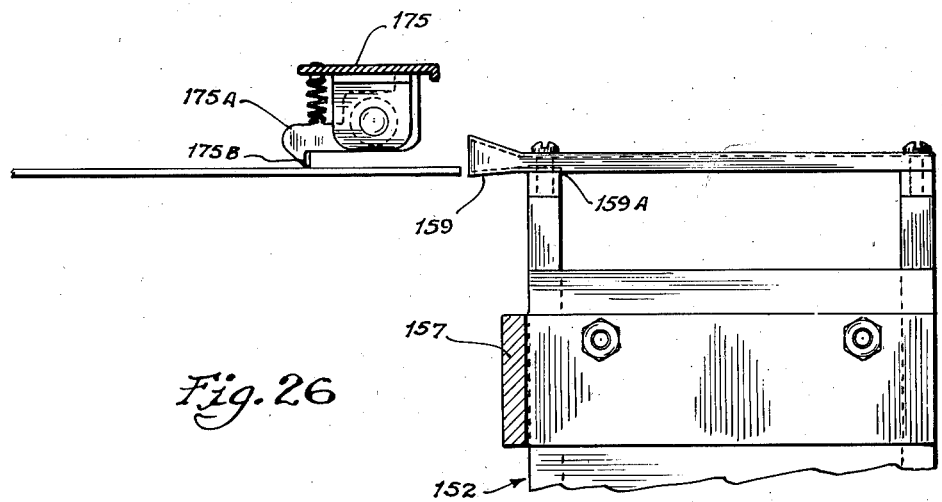
Fig. 26 is a fragmentary vertical sectional view illustrating the plate ejecting mechanism.

The ejecting movements are imparted to the plate P in the ejecting position of the turret by means of a swingable ejecting arm 175 that is pivoted on a mounting stud 176 carried on a horizontal mounting plate 177 that extends across the top of the front and rear bearing portions 106F and 106R of the bracket 106. The ejecting arm 175 is thus capable of movement about a vertical axis by means that will be described presently, and at a point spaced to the right, Fig. 1, from the pivot, a stationary supporting bar 178 is disposed so that the ejecting arm 175 may be supported in a sliding relation upon the bar 178. The right hand end of the ejecting arm 175 has a spring pressed ejecting pawl 175A mounted thereon, and this ejecting pawl 175A has a tooth 175B, Fig. 26, that is arranged, in the rearward movement of the pawl 175A, to ride along or over the upper face of the printing plate that is in ejecting position. As the ejecting lever reaches the rear end of its movement, the tooth 175B drops down over the rear edge of the printing plate that is disposed in ejecting position, and upon reversal of movement of the ejecting arm 175, the tooth 175B engages the rear edge of the printing plate and the printing plate is moved away from the stop pin 137 and in a forward or ejecting direction so as to enter the throat 159 of the chute 152. In this connection it will be observed that the upper wall of the throat 159 is suitably slotted to afford clearance for the pawl 175A in the terminal portion of the ejecting movement thereof.

It will be observed that while the ejecting arm 175 is thus displaced from its normal or home position, the plate loading operation of the plate feeding slide 140 takes place, as will hereinafter be described in detail, and since the carriage 65 is held in its loading position by spring means, means affording a positive reaction for the plate loading forces are also provided. Such means are rendered effective by the plate ejecting arm 175, and to this end a retaining arm 179 is pivoted at 179A on a vertical axis on the plate 177 somewhat forwardly and to the right of the pivot 176. The lever 179 has an upstanding arm 179B, Fig. 15, formed thereon which lies in the path of forward movement of a bracket 178B formed on the arm 175. Thus the arm 175 moves the arm 179 to its forward position of Fig. 5 at the end of a plate ejecting operation, such action being against the tension of a spring 179C, Fig. 5. With the above described structure, this arm 179 follows the arm 175 rearwardly as it starts on a plate ejecting cycle, and in the course of such movement a notch 179D in the right hand end of the lever 179, Fig. 5, moves into engagement with the left forward corner of the carriage 65, Fig. 5. Thus, the shoulder afforded by the notch 179D holds the carriage 65 against the left hand plate loading forces exerted by the plate loading slide 140. The retaining arm 179 is of course returned to its ineffective position after the plate loading and ejecting operations have been completed, thereby to condition the parts for the carriage return movements.

After a plate loading and plate ejecting operation has been performed with the carriage 65 in its right hand or loading position, the carriage must of course be returned to the left to a proper starting position, and this return movement of the carriage 65 is utilized under the present invention in causing the desired indexing movement of the turret 115. Thus as will be evident in Figs. 1, 6, 7, 13, and 14, the actuating plate 120 of the turret has four upstanding rollers 180 provided thereon adjacent the respective corners of the plate 120. When the carriage 64 is disposed in its right hand or loading position, and prior to the time when the return movement is to be initiated, means are rendered effective to engage one of the rollers 180, thereby to hold or restrain the forward edge of the turret 115 against return movement, and thus when the carriage 65, and the pivot pin 116 that is carried thereby, are returned to the left, the turret 115 is caused to rotate in a counterclockwise direction as viewed in Fig. 6. The restraining means that are thus utilized in attaining the desired indexing movement of the turret 115 are afforded in the present instance by a restraining lever 182 that is pivoted on a horizontal pivot pin 183 that is extended rearwardly from the magazine M near the lower end thereof. The left hand end of the lever 182 has a downwardly extending lug 185 at its left hand end, this lug being relatively long in a front to rear direction so as to afford a plate surface for rolling engagement by the roller 180 as the turning movement of the turret 115 progresses.

The right hand end of the lever 182 is bent downwardly at 182A and is then bent in a horizontal direction at 182B and a relatively long bolt 186 is extended downwardly through an opening in the portion 182B and is anchored in the plate 110. Above the portion 182B an expansive coil spring 187 acts between the head of the bolt 186 and the portion 182B, and this tends normally to rock the lever 182 in a clockwise direction to an inactive position wherein the lug 185 of the arm is out of the path of the upstanding rollers 180. This retracted position is shown in dotted outline in Fig. 7 of the drawings, and when the lever 182 is in this retracted position, the carriage 65 may be moved back and forth along the rail 68 for the normal carriage return purposes without causing indexing of the turret 115. When however the turret 115 is to be indexed after the performance of a plate loading operation, the restraining lever 182 is moved to its active position, and this is accomplished by an actuating rocker 188 that is pivoted at 189 on a mounting stud carried on the bracket 107. The rocker 188 has an upwardly extending arm which acts with a camming action on the lower face of the portion 182B of the lever 182 and when the rocker 188 is in its most clockwise position of Fig. 13, the restraining lever 182 is held in its active position. The rocker 188 has a relatively wide downwardly extending portion to which a spring 191 is connected so as to urge the rocker in a counterclockwise direction, Fig. 13, toward an inactive position, and when the rocker is moved to its active position, a latch 193 is urged by a spring 194 into engagement with a tooth 195 formed on the lower edge surface of the rocker 188. As will hereinafter be described in greater detail, the rocker 188 is moved to its effective position as an incident to the performance of the plate loading and ejecting operation, and the latch 193 holds the rocker 188 in its effective position during the carriage return operation and substantially at the end of the carriage return operation and after the indexing movement of the turret 115 has progressed to such a point that the tooth 147A is partially engaged with the next slot 144, the latch 193 is disengaged and the rocker 188 and the restraining arm 182 are caused to return to their inactive positions.

Under and in accordance with the present invention the carriage release bail 90, the escapement release bail 92, the line spacing bail 85, the printing device feeding and ejecting means, the carriage return means and the slide 164 of the packer are operated by power means, and selective control means are afforded whereby such power means may be rendered effective to cause operation of any of the aforesaid means at the proper time in the machine cycle. In affording such selectively operable power driven means for operating the aforesaid mechanisms of the machine, a constantly driven operating shaft 200 is extended in a front to rear direction through the spaced upwardly extending elements 106R and 106F of the bracket 106, and this shaft 200 at its rear end is supported by bearing means carried on an upstanding bearing plate 202. Just rearwardly of the bearing plate 202, the shaft 200 carries a gear 203 and this gear meshes with an idler pinion 204 carried on a bearing stud 205 mounted in the plate 202. The idler pinion 204 is meshed with a pinion 206 that is fixed on the rear end of the shaft 64. Such gearing is shown in Figs. 1, 2 and 10, and it will be evident that the operating shaft 200 is driven at a rate that is substantially less than the rate of rotation of the die shaft 61A.

Under the present invention the operating shaft 200 is selectively connectable to operating means that are effective to accomplish the several functions hereinabove enumerated, and for this purpose, five clutches of the one-revolution type are mounted on the shaft 200. Four of these clutches are identical in basic construction and are disposed on the shaft 200 between the upstanding portions 106R and 106F of the bracket 106, while the other of the five clutches is of a different construction and is designated in the drawings as clutch 208. The clutch 208 is disposed in an outboard relationship on the forward end of the shaft 200, and this clutch is utilized for controlling and operating the packer slide 164. Thus as is shown in Figs. 2 and 3 of the drawings, the clutch 208 comprises a generally cup-shaped driven member 208A that is rotatably mounted on the shaft 200 and has an eccentric 208E connected thereto. The eccentric 208E has a band 208F arranged thereabout and this band has a connecting plate formed integrally therewith and pivoted at 209 to the slide 164 of the packer mechanism. Thus when the driven member 208A is rotated through a complete revolution, the packer slide 164 will be withdrawn in a left hand direction and is then returned in a right hand direction through a plate-packing stroke so as to come to rest at the right hand end of this stroke. The clutch 208 has a driving member 208B afforded by a hub pinned to the shaft 200 and having a plurality of equally spaced notches 208C formed in the periphery thereof, and a clutch dog 210 pivoted at 211 in the driven member 208A has a tooth 212 that is adapted to engage any one of the notches 208C. The clutch dog 210 is urged in a clockwise direction about its pivot 211 by a spring 213 so as to normally tend to engage the clutch, and an arm 214 on the dog 210 extends outwardly through a slot 215 in the peripheral wall of the driven member 208A. A stop arm 208S is pivoted on a mounting shaft 218 in such a position that the inturned end 208T thereof may be moved inwardly toward the surface of the driven member 208A so as to thereby be disposed in the path of the arm 214. Thus when the stop arm 208S is in its active position of Fig. 3, the dog 210 of the clutch will be held in its released position. Upon counterclockwise rotating movement of the stop arm 208S the clutch dog 210 is allowed to engage a notch 208C of the driving member 208B, and hence the driven member 208A of the clutch will be rotated through a complete revolution, at the end of which the stop lever 208S will again engage the arm 214 and will disengage the dog 210. This brings the driven member 208A of the clutch 208 to rest in a predetermined rotative position wherein the packer slide 164 is disposed across the chute 152. The stop lever 208S of the clutch 208 is normally urged to an active position by a spring 215, and the stop lever is momentarily shifted to its inactive position as will hereinafter be described when the packer mechanism is to be operated.

Just rearwardly of the forward member 106F of the bracket 106, a clutch 221 is associated with the shaft 200, and the clutch 221 is utilized in affording power operated means for actuating the line space bail 85. Just rearwardly of the clutch 221, a clutch 222 is mounted, and as will hereinafter be explained in detail, this clutch 222 is utilized to effect operation of the carriage release bail 90. Just rearwardly of the clutch 222 a clutch 223 is mounted on the shaft 200, and the clutch 223 is utilized in effecting operation of the printing device feeding and ejecting mechanism. Rearwardly of the clutch 223, and just forwardly of the rear wall of the bracket 106, a clutch 224 is mounted and this clutch is utilized as will hereinafter be explained to effect return or left hand movement of the carriage 65.

Clutches 221, 222, 223 and 224 are substantially similar in their basic construction, and this basic construction is illustrated in detail in Figs. 23 to 25 of the drawings. Thus as applied to the clutch 224, a cup-shaped driving member 224A is mounted on the shaft 200 and is secured thereto by a connecting pin 225, and within the cup-shaped driving member 224A, a driven member 224B of the clutch is rotatably mounted on the shaft 200 by means including a bearing sleeve 226 to which the driven member 224B is fixed. Just to the right of the driven member 224B, as viewed in Fig. 25 of the drawings, a connecting plate 224C is supported on the sleeve 226 for relative rotation, and the connecting plate 224C has a plurality of radially floating rollers 224D projecting axially therefrom and into wedge-shaped spaces formed between the inner surface of the flange of the driving member 224A and the driven member 224B. In the present instance three rollers 224D are afforded, and the driven member 224B has three arms 228 that are disposed in the spaces between the three rollers 224D. As indicated by the arrows in Fig. 24, the driving member 224A rotates in a clockwise direction and by engagement with the rollers 224D tends to move these rollers and the plate 224C, in a clockwise direction. In such movement relative to the driven member 224B, the rollers move along surfaces 228T of the arm 228, these surfaces being disposed at such an angle that in such movement the rollers wedge between the inner surface of the driving member 224A and the surfaces 228T, and thus clockwise movement is transmitted from the driving member 224A to the driven member 224B of the clutch. The plate 224C and the rollers 224D carried thereby are constantly urged in a clockwise or engaging direction with respect to the driven member 224B by a plurality of spring plungers 230 mounted in the other or leading surfaces 228L of the arms 228, and in order to disengage the clutch 224 it is necessary to hold the connecting plate 224C against rotation, thereby to cause relative movement of the rollers in a reverse or disengaging direction and against the force of the spring plungers 230. Thus the peripheral edge of the plate 224C has a notch 224N formed therein and a stop lever 224S is arranged for operative engagement for the notch 224N to disengage the clutch 224. The stop lever 224S is mounted on a supporting shaft 232 that is extended between the bracket elements 106R and 106F, and a spring 233 constantly urges the stop lever toward an effective passage wherein a projecting arm 234 on the stop lever is in position for engagement with the notch 224N. The stop lever 224S is extended to the left in Fig. 23 beyond the supporting shaft 232 and an operating key 224K is provided on the lever so that the lever 224S may be rocked to the dotted line position of Fig. 23, this position being determined by engagement of the left hand end of the lever with a stop shaft 235 extended between the bracket portion 106R and 106F. The sleeve 226 upon which the driven member 224B of the clutch is fixed is extended to the right beyond the connecting plate 224C and the mechanism that is to be operated by the clutch is operatably connected to the sleeve so as to be driven thereby.

Figure 8:
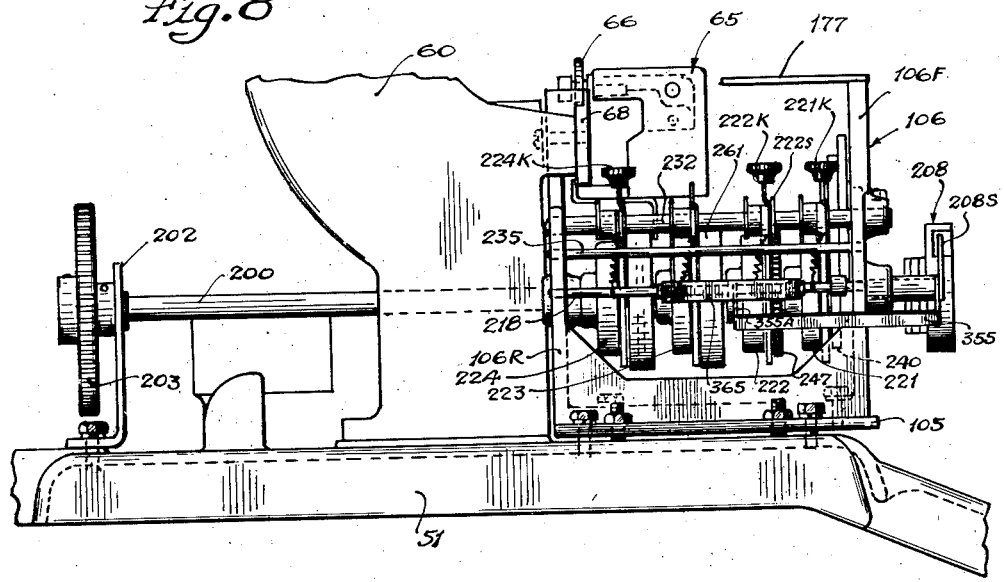
Fig. 8 is a fragmentary side elevational view of the machine as viewed from the left in Fig. 1.
Figure 9:
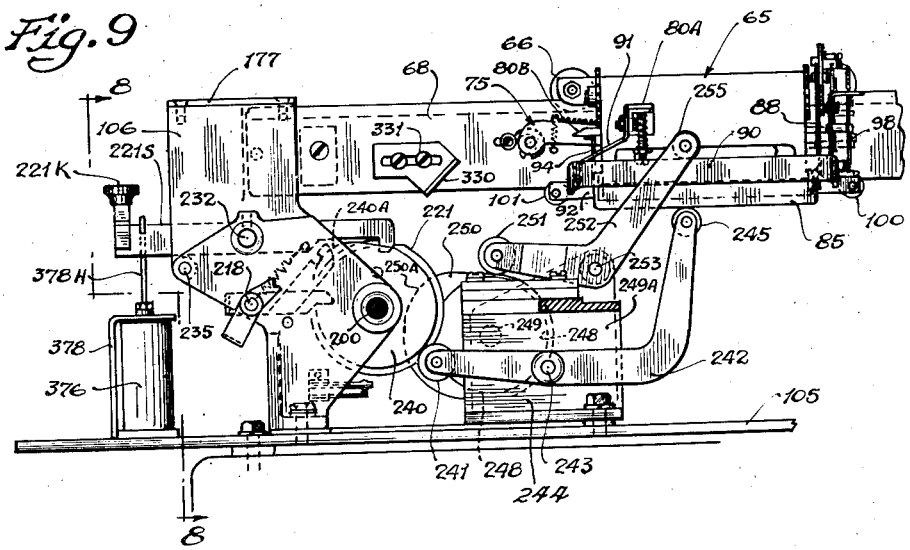
Fig. 9 is a fragmental front elevational view taken partially in section and illustrating the carriage release mechanism and line spacing mechanism.

In the case of the clutch 221, Figs. 2, 8 and 9, the sleeve of the driven element of the clutch is utilized to impart rotation to a cam 240 having a lobe 240A, and the lobe 240A is arranged to engage a roller 241 secured on one end of a bell crank lever 242, this bell crank lever being pivoted at 243 on a bracket 244 mounted on the base plate 105. The other arm of the bell crank 242 has a roller 245 thereon that is disposed beneath the line spacing bail 85, and a spring 246 acting on a rearwardly extending arm of the bail 85, Fig. 21, acts through the bail 85 and the roller 245 to maintain the roller 241 in yielding engagement with the cam 240. When the clutch 221 is to be engaged so as to cause a line spacing operation of the cross slide 70, the stop lever 221S of the clutch 221 is momentarily disengaged, and this may be accomplished manually if desired by depression of a key 221K that is associated with the left hand end of the lever 221S as shown in Figs. 1, 2, 8 and 9. The cam lobe 240A is in the present case so disposed with respect to the stop position of the driven member of the clutch 221 that the roller 241 and the bail 85 are actuated when the clutch 221 is substantially halfway through its one-revolution cycle and upon completion of this cycle, the stop lever 221S brings the driven clutch member and the cam 240 to rest in the relationship shown in Fig. 9 of the drawings.

The clutch 222 has the sleeve of the driven member operatively connected to a gear 247, Figs. 2 and 8, which is in turn meshed with a gear 248, Figs. 2 and 9, carried on a stub shaft 249 mounted on a bracket 249A, and the gear 248 has a cam 250 fixed thereon so as to be rotated when the gear 248 is rotated. The relationship between the gears 247 and 248 is such that the cam 250 operates through one revolution in each one-revolution cycle of the clutch 222. The cam 250 is thus rotated in a counterclockwise direction, and on its upper periphery the cam is engaged by a roller 251 carried by a bell crank 252, and this bell crank is pivoted on a stud 253 carried on the bracket 249A. The other arm of the bell crank 252 has a roller 255 extended rearwardly therefrom and this roller overlies the carriage release bail 90. It will be observed that the rollers 245 and 255 engage edge surfaces of the bails 85 and 90 respectively that are parallel to the path of movement of the carriage 65, and hence these rollers may be actuated at any longitudinal position of the carriage 65; and moreover, these rollers are ineffective to cause actuation of the related bails unless the bell cranks upon which such rollers are mounted are actuated or rocked. The cam 250 has a lobe 250A that has its leading portions arranged to start actuation of the roller 251 soon after the rotation of the cam 250 is started, and after about 60° of rotation of the cam 250, the roller comes into contact with a dwell surface that extends for somewhat over 50°, and thereafter a receding surface is engaged so that the reciprocating stroke of the roller 251 is completed at about the time the cam 250 has been rotated through one half of its rotative cycle. The spring means 90A, Fig. 21, that act upon the carriage release bail 90, act of course through the roller 255 and the bell crank 252 to hold the roller 251 yieldingly in engagement with the cam 250.

When the cam 250 is to be operated through a carriage release operation, the clutch 222 may be caused to engage by momentarily releasing the stop lever 222S of this clutch, and this may be accomplished manually by actuation of a key 222K that is afforded on the left hand end of the stop lever 222S, as shown in Figs. 1, 2 and 8 of the drawings.

The clutch 223 that serves to operate the printing device feeding and ejecting means of the machine has an eccentric 260, Figs. 2, 8 and 15 fixed to the sleeve of the driven member, and the eccentric 260 has a band 261 to which an elongated connecting rod means is adjustably connected. The connecting rod means in the present case is embodied as a part of an overload release mechanism 265 and is associated therewith in a manner that will be described presently. The other end of the overload release mechanism 265 is connected by a pin 266 and a clevis 267 to an intermediate point on a rocking arm or lever 270, the lower end of which is pivoted at 271 on a bracket 272 secured to the plate 105 beneath the right hand end portion of the plate 110. The lever 270 extends upwardly to a point somewhat below the lower face of the plate 110, and a link 275 is pivotally connected between the upper end of the lever 270 and a lug 240A that extends downwardly through the plate 110 from the printing device feeding slide 140. Thus when the lever 270 is rocked to the left, the printing device feeding slide 140 is moved in a left hand direction through a feeding stroke, and as an incident to such feeding stroke, the restraining lever 182 is set into its operative position. Thus the lower end portion of the rocker 188 has a roller 188A extended forwardly therefrom, and a laterally projecting bracket 277 on the lever 270 is arranged to engage the roller 188 as the lever 270 moves to the left, and this rocks the rocker 188 to its effective position wherein it is latched by the pawl 193.

It will be recognized that in machines of the character herein disclosed, there is a possibility that the printing devices may become jammed in the guide passages through which they must be moved, and it is to provide for such contingencies that the overload release device 265 is afforded. The overload release mechanism 265 is shown in detail in Figs. 18 to 20 of the drawings wherein it will be evident that a sleeve 278 has a connecting rod 279 disposed for longitudinal sliding movement thereon. The remote ends of the sleeve 278 and the rod 279 have screw threaded connections 280 afforded thereon whereby these elements may be connected respectively to the band 261 and the clevis 267. The sleeve 278 has a collar 281 formed thereon at one end thereof, this collar being slotted as at 282 to receive retaining pawls 283 at opposite sides thereof. The retaining pawls 283 are pivoted at 283A in the slots 282 and the inturned ends 283E of the pawls 283 are adapted to engage in an annular groove 284 formed in the rod 279. Pins 283B are extended laterally outwardly from the pawls 283, and springs 285 are extended between the pins 283B thereby to urge the ends 283E of the pawls into the groove 284. The parts of the overload release mechanism 265 normally occupy the relationship illustrated in Figs. 18 and 19 of the drawings, but when the endwise separating forces applied between the sleeve 278 and the rod 277 exceed a value determined by the springs 285, the pawls 283 will be cammed out of engagement with respect to the groove 284, thereby to assume the relationship shown in Fig. 20 and allow the rod 279 to be freely withdrawn from the sleeve 278 as will be evident in Fig. 20. In the next operation of the driving mechanism the rod 279 will move back to the position of Fig. 19 so as to reestablish the desired driving connection.

The clutch 223 also functions to operate the printing device ejecting arm 175, and for this purpose the lower end of the mounting shaft 176 has a rearwardly projecting arm 287 fixed thereto and this arm 287 is connected by an adjustable link 288 to an intermediate portion of a downwardly projecting arm 290. The upper end of the arm 290 is pivoted at 291 on the plate 177, and at its lower end, an overload release mechanism is connected to the arm 290, whereby rocking movement may be imparted to the arm 290 so as to thereby impart oscillating movement to the ejecting lever 175. The requisite movement is imparted to the overload link 292 by connection with the band 261 of the eccentric 260. Thus a bracket 294 is secured by screws 295 on the top of the band 291, and the link 292 is pivotally connected to the bracket 294 as will hereinafter be described. The pivot point on the bracket 294 is of course moved through a circular path as an incident to the operation of the eccentric 260, and in such movement of the pivot, the desired oscillating movements are applied to the ejecting lever 175.

The overload release device 292 is illustrated in detail in Figs. 16 and 17 of the drawings where it will be evident that this device comprises a pair of elongated arms 296A and 296B that are pivoted together at one end by the pin 292A. The arm 296A has an elongated slot 297 formed therein while the member 296B has a slot 298 therein, and when the two slots 297 and 298 are in alignment as shown in Fig. 17, a laterally projecting connecting pin 299 that is provided on the lower end of the arm 290 may move freely through the slots 297 and 298 in a direction longitudinally of these slots. The left hand ends of the two levers 296A and 296B are connected by a spring 300 so as to tend to move the levers from the relationship shown in Fig. 17 to the relationship shown in Fig. 16, and an arcuate notch 301 in the upper edge of the slot 298 is arranged for interlocking engagement with the pin 299. Thus the parts ordinarily assume the relationship shown in Fig. 16 so as to constitute a motion transmitting connection, but in the event that the left hand movement of the plate feeding slide 146 is interrupted by a jam in the plate guiding track, the forces applied in a left hand direction to the pin 299 will cause the same to cam the lever 296B in an upward direction and the pin 299 will then move freely through the aligned slots to the position shown in Fig. 17 of the drawings. The motion transmitting relationship between the notch 301 and the pin 299 will of course be reestablished when the clutch 223 operates the eccentric 260 in the next rotative cycle. At the end of a cycle of operation of the clutch 223, the parts of the printing device feeding mechanism occupy the relationship shown in Fig. 15 of the drawings, but it should be noted in this respect that the latch 193 will be released prior to the next plate feeding cycle in a manner that will hereinafter be described in detail.

The clutch 224 that functions to impart return movement to the carriage 65 has an eccentric 310 fixed to the sleeve thereof, this eccentric being shown in Figs. 2, 11 and 13, and the eccentric 310 has a band 311 connected thereto in an encircling relation. The band 311 has an overload release mechanism 315 associated therewith that is of the same character as the overload release mechanism 265 and this overload release mechanism 315 is pivoted at 316 at its other end to a carriage return lever 317. The carriage return lever 317 is pivoted at its lower end and 318 on a bracket 319 secured to the plate 105, and at its upper end, the lever 317 has a motion transmitting surface 317S that is adapted to engage a grooved roller 320 that is carried on the lower right hand end of a rigid arm 321 extended downwardly and to the right from the bottom of the carriage 65. Thus upon rotation of the eccentric 310, the arm 317 rocks to the left in Figs. 11 and 13, and upon engagement with the roller 320, imparts left hand or return movement to the carriage 65. In the return movement of the carriage 65 it is of course desirable to avoid wear upon the escapement mechanism 75, and in order that this may be accomplished, means are afforded in association with the lever 317 for releasing the escapment mechanism 75 just before the left hand or return movement of the carriage 65 is started. For this purpose, a lever 325 is pivoted on the pivot 318 just forwardly of the lever 317, and the lever 325 has a cam surface 326 at its upper end that is adapted for engagement with the roller 100 of the escapement release bail 92. The arm 325 is urged in a counterclockwise direction with respect to the lever 317 by a spring 327 and the relationship thus established is limited and determined by a pin 328 on the lever 325 which engages the right hand edge of the lever 317. Thus when the carriage 65 is in its right hand or loading position and a carriage return operation is initiated by engagement of the clutch 224, the lever 317 will be rocked in a counterclockwise direction. As will be evident in Figs. 11 and 12, the surface 317S is at this time spaced slightly from the roller 320, and the relationship between the cam surface 326 and the roller 100 is such that prior to the time when the surface 317S engages the roller 320, the roller 100 will be raised and the escapement 75 will be released at substantially the time the lever 317 engages the roller 320. The cam surface 326 will of course serve to maintain the escapement 75 in its disengaged relationship throughout the entire return movement of the carriage 65, but when the extreme left hand position of the carriage 65 has been reached, it is essential that the escapement 75 be re-established or re-engaged prior to the time when the lever 217 starts its return or right hand movement. In accomplishing this re-engagement of the escapement 75, the roller 101 on the escapement release bail 92 is utilized. Thus as will be evident in Figs. 9, 11 and 13, a restoring cam 330 is adjustably mounted by means of screws 331 on the forward face of the rail 68. The lower face of the cam 330 slopes downwardly to the left as shown in Figs. 9 and 11, and the relationship of this surface is such that it will be engaged by the roller 101 at substantially the time when the return movement of the carriage 65 has been completed. The roller 101 will therefore be cammed downwardly as the carriage 65 reaches its fully returned position, and the cam 330 will thus re-engage the escapement 75. When this condition has been established, the carriage 65 will be held in its return position and the cam surface 326 of the lever 325 cannot thereafter be effective to release the escapement while the carriage 65 remains in this position. Hence, upon the reversal of movement of the lever 317, the lever 325 will remain in engagement with the then stationary roller 100 until the lever 317 engages the pin 328 and the levers 317 and 325 will thereupon move in right hand direction to their initial or rest positions of Fig. 13.

It will be recognized that in the course of the return movement of the carriage 65, the indexing movement of the turret 115 will have taken place, and when this indexing movement has progressed to such a point that the locating tooth 147A is engaged with the next one of the notches 144, it is desirable that the latch 193 be released so that the restraining lever 182 may return to its normal or ineffective position. This is accomplished by a link 335 that is pivoted at 336 to the lever 317, as shown in Fig. 13, and at its right hand end, the link 335 has a slot 335A extending longitudinally of the lever. The slot 335A is arranged to embrace a pin 338 that is afforded on the lower end of an arm 193A of the latch 193. The latch 193 and the arm 193A are in the form of a bell crank that is pivoted at 339, and the relationship between the right hand end of the slot 335A and the pin 338 is such that when the indexing movement of the turret 115 has progressed to such a point that the turret is again under control of the locating tooth 147A, the right hand end of the slot 335A will engage the pin 338 and release the latch 193. This of course allows the restraining lever 182 to return to its normal or inactive position.

It has been pointed out hereinbefore that the machine of the present invention is so arranged that the various plate handling and positioning functions are performed as quickly as possible, one after the other, where such operations are invariably related in the use of the machine. Thus when the embossing of characters on a plate P has been completed and the carriage 65 is to be returned to its right hand or loading position, the carriage release clutch 222 is started through its one-revolution cycle by actuation of the stop lever 222A. When the rotation of the carriage release cam 250 is substantially three-quarters completed, means are effective to initiate operation of the plate feed clutch 223. For this purpose, a bail 350 is mounted on the shaft 218, as will be evident in Figs. 2, 8 and 14, and this bail 350 has an arm 350A disposed just rearwardly of the stop lever 223S of the plate feed clutch 223. The arm 350A has a pin 350P disposed thereon adjacent the end thereof, and the pin 350P is arranged to underlie the right hand portion of the stop lever 223S. Thus when the bail 350 is rocked in a counterclockwise direction from the position shown in Fig. 14, the pin 350P is effective to move the stop lever 223S to a released position. Such rocking movement is imparted to the bail 350 by means that are associated with the driven element of the carriage release clutch 222, such means being arranged to engage the other arm 350B of the bail 350 that is disposed just forwardly of the gear 247. Thus as shown in Figs. 2 and 14, a pin 351 is mounted so as to project forwardly from the gear 247, and this pin 351 is so disposed that it will engage the arm 350B when the driven element of the clutch 322 is substantially 270° in its rotative cycle. The bail 350 is thus rocked, while the pin 351 is in engagement with the arm 350B, so as to release the stop lever 223S of the plate feed clutch 223, and the plate feeding and ejecting mechanisms are therefore started through their operating cycles.

When a completed plate P is discharged into the chute 152 of the plate collecting and packing mechanism it is desirable to operate the packer mechanism 153 through a packing cycle, and this is accomplished automatically by means under control of the plate feed mechanism. Thus as will be evident in Figs. 2, 3 and 8 of the drawings, the stop lever 208S of the packer clutch 208 has a bail 355 connected thereto, and this bail extends rearwardly and has a rear arm 355A that is pivotally supported on the shaft 218 just forwardly of the eccentric 260 of the plate feeding mechanism. When the packer clutch 208 is to be started through a one-revolution cycle, it is necessary that the bail 355 be rocked in a counterclockwise direction, Fig. 3, and this is accomplished by means that are associated with the eccentric 260 of the plate feed clutch. Thus as will be evident in Figs. 2 and 3 of the drawings, a curved link 357 is pivoted at 358 to the arm 355A of the bail 355. The link 357 extends to the right beneath the shaft 200 and then extends upwardly to a point somewhat above the level of the shaft 200. At its right hand end the link 357 is pivoted at 359 on a rocking lever 360, the lower end of the lever 360 being pivoted at 361 on a bracket 362 that is secured to the base plate 105, and such structure is shown in Fig. 3 of the drawings. Upwardly of the pivot 359, the arm 360 has a cam surface 360A that is adapted to be engaged by a pin 363, Fig. 15, that extends forwardly from the eccentric 260. The pin 363 is so arranged that at substantially the end of the rotative cycle of the plate feeding clutch 223, the pin 363 engages the cam surface 360A to rock the lever 360 in a clockwise direction, Fig. 3, and this rocking movement acts through the link 357 to rock the bail 355 in a counterclockwise direction. Thus the stop lever 208S is moved momentarily to its released position and the packer clutch 208 starts on its one-revolution cycle.

After the carriage has been released and the requisite plate feeding, ejecting and packing operations have been performed in the manner just described, the machine is in condition for the next series of embossing operations, and as a preliminary to these embossing operations the carriage 65 must be returned to the left to its initial position and the cross slide 70 must be advanced in a line spacing direction toward a proper position for the production of the first line of embossed characters. When the carriage is to be thus returned, operation of the carriage return mechanism is initiated by momentary actuation of the stop lever 224S of the carriage return clutch 224. The cycle of operation of the carriage return mechanism is thereby initiated, and means are associated with the carriage return clutch 224 so as to be effective to cause operation of line spacing means. Thus, as shown in Figs. 2, 4 and 8 of the drawings, a bail 365 is pivoted on the shaft 218 so that the forward arm 365A of the bail is disposed just rearwardly of the stop lever 221S of the line spacing clutch. At its right hand end, the lever or arm 365A has a pin 366 that extends beneath the right hand end of the stop lever 221S, and with this arrangement, the rocking of the bail 365 in a counterclockwise direction is effective to initiate operation of the line spacing clutch 221. Such rocking movement of the bail 365 is caused by means associated with the carriage return eccentric 310. Thus, the bail 365 has an arm 365B disposed just forwardly of the eccentric 310, and the eccentric 310 carries a forwardly projecting pin 368 that is arranged to engage the lower surface of the arm 365B in the course of rotation of the eccentric 310. The arrangement is such that the pin 369 strikes the arm 365B at about 270° in the rotative cycle of the carriage return clutch 224, and at this time the one-revolution cycle of the line feed clutch 221 is initiated.

In the foregoing description of the control of the various operating clutches of the machine, reference has been made to the operation of these clutches under control of the various stop levers such as the stop lever 224S. These stop levers are so disposed in the present machine that the keys 224S are located at the side of the machine so that these keys are not readily accessible. It will be recalled however, that the keyboard 52 is provided with special keys 54, 55 and 56, and these keys are operatively associated with the stop levers of certain of the clutches. Thus the key 56 is preferably allocated to the control of the carriage release operation, and for this purpose a solenoid 370 is mounted on the plate 105 beneath the left hand end of the lever 222S. The armature of the solenoid 370 has a hook-shaped connector 370H extended upwardly therefrom and arranged to hook over the stop lever 222S, and an energizing circuit for the solenoid 370 is arranged to be closed by depression of the key 56. Similarly, the key 55 is preferably allocated to the control of the carriage return clutch 224, and for this purpose a solenoid 372 is disposed beneath the left hand end of the stop lever 224S. The armature of the solenoid 372 has a hook-shaped element 372H extended upwardly therefrom and hooked over the stop lever 224S, and an energizing circuit to the solenoid 372 is arranged to be closed by depression of the special key 55.

A similar solenoid 376 disposed beneath the stop lever 221S has a hook member 376H associated with its armature, and hooked over the stop lever 221S. The solenoid 376 has an energizing circuit that is arranged to be controlled or closed by depression of the key 54 so that the key 54 may be utilized to initiate a line spacing operation of the machine. The solenoids 370, 372 and 376 are preferably protected and housed within a bracket 378 that is secured to the base plate 105. It will be observed that in the present instance the stop lever 223S is not provided with an operating solenoid, nor is it provided with a key at the left hand end thereof, and this arrangement has been utilized because in practice it has been found that a plate feeding and ejecting operation must in every instance follow a carriage release operation and this is accomplished by the bail 350 as hereinbefore described.

The machine that is thus afforded enables the printing plates to be loaded and unloaded in a simple and effective manner so as to facilitate the attainment of high production, and in this respect the power operation of the carriage and cross slide are of material assistance. The machine of the present invention is of course adapted for manual control during which the required machine operations are initiated by actuation of the appropriate keys, but this same basic form of machine is equally adaptable for automatic control by a reader mechanism which reads coded control data from a control tape or card and governs the machine in accordance with such data. Such an embodiment of the present machine for automatic control is shown in my copending application Serial No. 783,588, filed November 1, 1947, wherein it will be clear that control switches, some of which are shown on the drawings of the present application, may be readily associated with the elements of the present embossing machine to attain the desired inter-related control of the embossing machine and the automatic control or reader mechanism.

From the foregoing description it will be evident that the present invention materially simplifies the production of embossed printing plates, and enables such embossed plates to be produced at a higher rate, either by manual control or automatic control of the machine. Moreover, it will be clear that the concurrent performance of the unloading and loading operation facilitates the attainment of high production in the present machine. The various plate handling means afforded by the present invention are of course related in a novel and highly advantageous manner so as to simplify the control of the machine while at the same time enabling rapid performance of the several operations that must be accomplished with respect to each printing plate.

It will also be apparent that the present invention enables an automatic plate handling means to be readily associated with an embossing machine, since the several related mechanisms, are under the present invention, incorporated in a separate unit which may be removed from or put in place on the embossing machine frame without disturbing the adjusted relationships of the several mechanisms. The control of the carriage movements under the present invention is particularly advantageous since the escapement is so controlled as to avoid possibility of undue wear or damage, while the rotatable character of the workholding turret serves to simplify the carriage movements so as to save operating time as well as avoid wear on the carriage and its operating means.

Thus, while I have illustrated and described the preferred embodiment of my invention, it is to be understood that it is capable of variation and modification and I, therefore, do not wish to be limited to the precise details set forth, but desire to avail myself of such changes and alterations which fall within the purview of the following claims.

I claim:

1. In an embossing machine, a plurality of settable pairs of punches and dies adapted to be moved selectively into an embossing position, a carriage mounted for reciprocation in character spacing and carriage return directions between an initial position and a loading position and past said embossing position, a cross slide mounted on said carriage for line spacing movement in a direction transverse to the reciprocating path of said carriage, a turret having a plurality of workholding means disposed about the periphery thereof and defining a plurality of equally spaced workholding positions thereon, means supporting said turret on said cross slide for rotative indexing movement to bring said workholding positions of said turret successively into embossing position, means acting between said cross slide and turret to hold said turret in any one of said plurality of indexed positions, and means at said loading position for loading a plate into one of said workholding positions and for concurrently unloading a plate from another of said workholding positions.

2. In an embossing machine, a plurality of settable pairs of punches and dies adapted to be moved selectively into an embossing position, a carriage mounted for reciprocation in character spacing and carriage return directions between an initial position and a loading postition and past said embossing position, a cross slide mounted on said carriage for line spacing movement in a direction transverse to the reciprocating path of said carriage, a workholder having a plurality of workholding means disposed at spaced locations thereon and defining a plurality of equally spaced workholding positions, means supporting said workholder on said cross slide for shifting movement to bring said workholding positions of said workholder successively into embossing position, means acting between said cross slide and workholder to hold the same in any one of said plurality of positions, and means at said loading position for loading a plate into one of said workholding positions and for concurrently unloading a plate from another of said workholding positions.

3. In an embossing machine, a plurality of settable pairs of punches and dies adapted to be moved selectively into an embossing position, a carriage mounted for reciprocation in character spacing and carriage return directions between an initial position and a loading position and past said embossing position, a cross slide mounted on said carriage for line spacing movement in a direction transverse to the reciprocating path of said carriage, a turret having a plurality of workholding means disposed about the periphery thereof and defining a plurality of equally spaced workholding positions thereon, means supporting said turret on said cross slide for rotative indexing movement to bring said workholding positions of said turret successively into embossing position, means acting between said cross slide and turret to hold said turret in any one of said plurality of indexed positions, means at said loading position for loading a plate into one of said workholding positions and for concurrently unloading a plate from another of said workholding positions, and means conditioned for operation as an incident to the operation of said plate loading means and operable to impart indexing movement to said turret.

4. In an embossing machine, a plurality of settable pairs of punches and dies adapted to be moved selectively into an embossing position, a carriage mounted for reciprocating movement from a predetermined loading position past said embossing position, a cross slide mounted on said carriage for line spacing movement in a direction transverse to the direction of the reciprocation of said carriage, a rotatable workholder mounted on said cross slide for rotation about an axis that is perpendicular to the paths of both said cross slide and said carriage, said rotatable workholder having a plurality of workholding means disposed about the periphery thereof and defining a plurality of equally spaced workholding positions, means acting between said cross slide and said rotatable workholder to yieldingly hold said workholder in any one of a plurality of indexed positions, means for feeding printing plates one at a time into an aligned one of said workholding means of said workholder when said workholder is disposed in said predetermined loading position, means for ejecting a printing plate from another one of said workholding means when said workholder is disposed in said loading position, means for operating said plate feeding means and said plate ejecting means concurrently, indexing means for imparting indexing movement to said workholder, and means operable to condition said indexing means for operation as an incident to the operation of said plate feeding means.

5. In an embossing machine having a plurality of settable pairs of cooperating punches and dies adapted to be moved selectively into an embossing position, a carriage mounted for reciprocation past said embossing position, spring means urging said carriage in a character spacing direction from an initial position toward a loading position, an escapement means for controlling movement of said carriage in said character spacing direction, a cross slide mounted on said carriage for line spacing movement in a direction transverse to the direction of the reciprocation of said carriage, a rotatable turret mounted on said cross slide for rotation about an axis that is perpendicular to the path of both said cross slide and said carriage, said turret having a plurality of workholding means disposed about the periphery thereof and defining a plurality of equally spaced workholding positions, means acting between said cross slide and turret to hold said turret in any one of a plurality of indexed positions, plate loading means and plate unloading means mounted adjacent said loading position for cooperation with different workholding means of said turret when said carriage is in said loading position, means for operating said loading and unloading means concurrently, carriage return means for returning said carriage through a return movement from any position along its path to said initial position, means operable to disengage said escapement means during such return movement of the carriage and to engage said escapement means at the end of such return movement, and means for imparting indexing movement to said turret after each plate loading operation of said plate loading means.

6. In an embossing machine, a plurality of settable pairs of punches and dies adapted to be moved selectively into an embossing position, a carriage mounting for reciprocation in character spacing and carriage return directions between an initial position and a loading position and past said embossing position, a cross slide mounted on said carriage for line spacing movement in a direction transverse to the reciprocating path of said carriage, a turret having a plurality of workholding means disposed about the periphery thereof and defining a plurality of equally spaced workholding positions thereon, means supporting said turret on said cross slide for rotative indexing movement to bring said workholding positions of said turret successively into embossing position, means acting between said cross slide and turret to hold said turret in any one of said plurality of indexed positions, means at said loading position for loading a plate into one of said workholding positions and for concurrently unloading a plate from another of said workholding positions, carriage return means for returning said carriage from said loading position to said initial position, and means rendered operative by said carriage return means and operable to impart a line spacing movement to said cross slide.

7. In an embossing machine, a plurality of settable pairs of punches and dies adapted to be moved selectively into an embossing position, a carriage mounted for reciprocation from a predetermined loading position past said embossing position, a cross slide mounted on said carriage for line spacing movement in a direction transverse to the direction of the reciprocation of said carriage, a rotatable workholder mounted on said cross slide for rotation about an axis that is perpendicular to the path of both said cross slide and said carriage, said rotatable workholder having a plurality of workholding means disposed about the periphery thereof and defining a plurality of equally spaced workholding positions, means acting between said cross slide and said rotatable workholder to yieldingly hold said workholder in any one of a plurality of indexed positions, means for feeding printing plates one at a time into an aligned one of said workholding means of said workholder when said workholder is disposed in said predetermined loading position, means for ejecting a printing plate from another one of said workholding means when said workholder is disposed in said loading position, means for operating said plate feeding means and said plate ejecting means while said carriage remains stationary in said loading position, normally inactive indexing means for imparting indexing movement to said workholder, means operable to condition said indexing means for operation as an incident to the operation of said plate feeding means, and means operated by said carriage return means to render said indexing means inactive at the end of a carriage return stroke.

8. In an embossing machine, a plurality of settable pairs of punches and dies adapted to be moved selectively into an embossing position, a carriage mounted for reciprocation from a predetermined loading position past said embossing position, a cross slide mounted on said carriage for line spacing movement in a direction transverse to the direction of the reciprocation of said carriage, a rotatable workholder mounted on said carriage for rotation about an axis that is perpendicular to the path of both said cross slide and said carriage, said rotatable workholder having a plurality of workholding means disposed about the periphery thereof and defining a plurality of equally spaced workholding positions, means acting between said cross slide and said rotatable workholder to yieldingly hold said workholder in any one of a plurality of indexed positions, means for feeding printing plates one at a time into an aligned one of said workholding means of said workholder when said workholder is disposed in said predetermined loading position, means for ejecting a printing plate from another one of said workholding means when said workholder is disposed in said loading position, means for operating said plate feeding means and said plate ejecting means concurrently, and indexing means for imparting indexing movement to said workholder.

9. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a plate-handling position, spring means urging said carriage in said character spacing direction, escapement means for controlling such character spacing movement of said carriage, a release element on said carriage including a release bail having the cross member thereof extended parallel to the carriage path and operable to release said escapement means to enable movement of said carriage in a character spacing direction to said plate-handling position, a cross slide mounted on said carriage for reciprocation transversely of the path of said carriage in line spacing and return directions, spring means urging said cross slide in a return direction, line spacing means on said carriage including a bail having a cross member extended parallel to the carriage path and operable to impart line spacing movements to said cross slide, a release element on said carriage connected to said release bail for operation thereby to release said line spacing means to thereby enable return movement of said cross slide, workholding means on said cross slide in which a printing plate may be mounted, and independent actuating means for said bails engageable therewith in any position of said carriage along its reciprocatory path.

10. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a plate-handling position, spring means urging said carriage in said character spacing direction, escapement means for controlling such character spacing movement of said carriage, a release member on said carriage operable to release said escapement means to enable movement of said carriage in a character spacing direction to said plate-handling position, a cross slide mounted on said carriage for reciprocation transversely of the path of said carriage in line spacing and return directions, spring means urging said cross slide in a return direction, line spacing means on said carriage including a line spacing member operable to impart line spacing movements to said cross slide, a release element on said carriage connected to said release member for operation thereby to release said line spacing means to thereby enable return movement of said cross slide, workholding means on said cross slide in which a printing plate may be mounted, and independent actuating means for said release member and said line spacing member and engageable respectively with such members in any position of said carriage along its reciprocatory path.

11. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a plate-handling position, spring means urging said carriage in said character spacing direction, escapement means for controlling such character spacing movement of said carriage, a release element on said carriage including a release bail having the cross member thereof extended parallel to the carriage path and operable to release said escapement means to enable movement of said carriage in a character spacing direction to said plate-handling position, a cross slide mounted on said carriage for reciprocation transversely of the path of said carriage in line spacing and return directions, spring means urging said cross slide in a return direction, line spacing means on said carriage including a bail having a cross member extended parallel to the carriage path and operable to impart line spacing movements to said cross slide, a release element on said carriage connected to said release bail for operation thereby to release said line spacing means to thereby enable return movement of said cross slide, workholding means on said cross slide in which a printing plate may be mounted, independent actuating means for said bails engageable therewith in any position of said carriage along its reciprocatory path, and power operated carriage return means including a yieldable cam member engageable with said release bail to release said escapement during return movement of said carriage.

12. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a plate-handling position, spring means urging said carriage in said character spacing direction, escapement means for controlling such character spacing movement of said carriage, a release element on said carriage operable to release said escapement to enable movement of said carriage in a character spacing direction to said plate-handling position, a cross slide mounted on said carriage for reciprocation transversely of the path of said carriage in line spacing and return directions, workholding means on said cross slide in which a printing plate may be mounted, actuating means for said release element engageable therewith in any position of said carriage along its reciprocatory path, a power operated carriage return means operable to return said carriage to its initial position, and means associated with said carriage return means and operable upon said release element to release said escapement means during return movement of said carriage.

13. In an embossing machine having a plurality of settable pairs of punches and dies adapted to be moved selectively into an embossing position, a carriage mounted for reciprocation in character spacing and carriage return directions between an initial position and a loading position and past said embossing position, a cross slide mounted on said carriage for line spacing movement in a direction transverse to the reciprocating path of said carriage, a turret having a plurality of workholding means disposed about the periphery thereof and defining a plurality of angularly spaced workholding positions thereon, means supporting said turret on said cross slide for rotative indexing movement to bring said workholding positions of said turret successively into embossing position, means acting between said cross slide and turret to hold said turret in any one of said plurality of indexed positions, means including a plurality of upstanding rollers disposed on said turret radially inwardly of said workholding positions and spaced angularly from each other in the same amount as said workholding positions, means at said loading position for loading a plate into one of said workholding positions and for concurrently unloading a plate from another of said workholding positions, a normally inactive restraining lever adapted for engagement with one of said rollers to effect indexing movement of said turret during return movement of said carriage, a latch for holding said restraining lever in an active position, means operable as an incident to the operation of said plate loading means to move said restraining lever to said active position, and means for releasing said latch upon completion of a turret indexing operation.

14. In an embossing machine having a plurality of settable pairs of punches and dies adapted to be moved selectively into an embossing position, a carriage mounted for reciprocation in character spacing and carriage return directions between an initial position and a loading position and past said embossing position, a cross slide mounted on said carriage for line spacing movement in a direction transverse to the reciprocating path of said carriage, a turret having a plurality of workholding means disposed about the periphery thereof and defining a plurality of angularly spaced workholding positions thereon, means supporting said turret on said cross slide for rotative indexing movement to bring said workholding positions of said turret successively into embossing position, means acting between said cross slide and turret to hold said turret in any one of said plurality of indexed positions, means including a plurality of upstanding rollers disposed on said turret radially inwardly of said workholding positions and spaced angularly from each other in the same amount as said workholding positions, means at said loading position for loading a plate into one of said workholding positions and for concurrently unloading a plate from another of said workholding positions, a restraining lever adapted for engagement with one of said rollers to effect indexing movement of said turret during return movement of said carriage, and means for rendering said restraining lever active during a return movement of said carriage.

15. In an embossing machine having a plurality of settable pairs of punches and dies adapted to be moved selectively into an embossing position, a carriage mounted for reciprocation in character spacing and carriage return directions between an initial position and a loading position and past said embossing position, a cross slide mounted on said carriage for line spacing movement in a direction transverse to the reciprocating path of said carriage, a turret having a plurality of workholding means disposed about the periphery thereof and defining a plurality of angularly spaced workholding positions thereon, means supporting said turret on said cross slide for rotative indexing movement to bring said workholding positions of said turret successively into embossing position, means acting between said cross slide and turret to hold said turret in any one of said plurality of indexed positions, means including a plurality of abutments disposed eccentrically on said turret so as to be spaced angularly from each other in the same amount as said workholding positions, means at said loading position for loading a plate into one of said workholding positions and for concurrently unloading a plate from another of said workholding positions, and means adapted for operative engagement with one of said abutments to effect indexing movement of said turret during return movement of said carriage.

16. In an embossing machine having a plurality of settable pairs of punches and dies adapted to be moved selectively into an embossing position, a carriage mounted for reciprocation in character spacing and carriage return directions between an initial position and a loading position and past said embossing position, a cross slide mounted on said carriage for line spacing movement in a direction transverse to the reciprocating path of said carriage, a turret comprising a circular plate having a plurality of workholding means disposed about the periphery thereof and defining a plurality of angularly spaced workholding positions thereon, means supporting said turret on said cross slide for rotative indexing movement to bring said workholding positions of said turret successively into embossing position, means disposed beneath said plate and acting between said cross slide and plate to hold said turret in any one of said plurality of indexed positions, means including a plurality of upstanding rollers disposed on said turret above said plate and radially inwardly of said workholding positions and spaced angularly from each other in the same amount as said workholding positions, means at said loading position for loading a plate into one of said workholding positions and for concurrently unloading a plate from another of said workholding positions, a normally inactive restraining lever adapted for engagement with one of said rollers to effect indexing movement of said turret during return movement of said carriage, and means for rendering said restraining lever active during a return movement of said carriage.

17. In an embossing machine having a plurality of settable pairs of punches and dies adapted to be moved selectively into an embossing position, a carriage mounted for reciprocating movement from a predetermined loading position past said embossing position, a cross slide mounted on said carriage for line spacing movement in a direction transverse to the direction of the reciprocation of said carriage, a rotatable workholder comprising a circular plate mounted on said cross slide for rotation about an axis that is perpendicular to the paths of both said cross slide and said carriage, said rotatable plate having a plurality of elongated openings formed therein adjacent to the periphery thereof and defining a plurality of equally spaced workholding positions in each of which a printing plate may be mounted so as to be disposed over the opening that defines such position, workholding means disposed on said plate along the opposite side edges of said openings for holding such printing plates in said workholding positions, means on said cross slide to yieldingly hold said workholder in any one of a plurality of indexed positions, means for feeding printing plates one at a time into an aligned one of said workholding means of said workholder when said workholder is disposed in said predetermined loading position, means for ejecting a printing plate from another one of said workholding means when said workholder is disposed in said loading position, means for operating said plate feeding means and said plate ejecting means concurrently, and indexing means for imparting indexing movement to said workholder.

18. In an embossing machine, a carriage mounted for reciprocating movement from a predetermined loading position through an embossing position, a cross slide mounted on said carriage for line spacing movement in a direction transverse to the direction of the reciprocation of said carriage, a rotatable workholder comprising a circular plate mounted on said cross slide for rotation about an axis that is perpendicular to the paths of both said cross slide and said carriage, said rotatable plate having a plurality of elongated openings formed therein adjacent to the periphery thereof and defining a plurality of equally spaced workholding positions disposed symmetrically with respect to the rotative axis of the workholder and in each of which a printing plate may be mounted so as to be disposed over the opening that defines such position, workholding means disposed along the opposite side edges of said openings including a yieldable retaining pawl for holding such printing plates in said workholding positions, means acting between said cross slide and said rotatable workholder for holding said workholder in any one of a plurality of indexed positions, means for feeding printing plates one at a time into an aligned one of said workholding means of said workholder when said workholder is disposed in said predetermined loading position, means for ejecting a printing plate from another one of said workholding means when said workholder is disposed in said loading position, and indexing means for imparting indexing movement to said workholder.

19. In an embossing machine having a plurality of settable pairs of punches and dies adapted to be moved selectively into an embossing position, a carriage mounted for reciprocating movement from a predetermined loading position past said embossing position, a cross slide mounted on said carriage for line spacing movement in a direction transverse to the direction of the reciprocation of said carriage, a rotatable workholder comprising a circular plate mounted on said cross slide for rotation about an axis that is perpendicular to the paths of both said cross slide and said carriage, said rotatable plate having a plurality of elongated openings formed therein adjacent to the periphery thereof and defining a plurality of equally spaced workholding positions in each of which a printing plate may be mounted so as to be disposed over the opening that defines such position, workholding means disposed along the opposite side edges of said openings for holding such printing plates in said workholding positions, means disposed beneath said plate and operable to hold said workholder in any one of a plurality of indexed positions, means for feeding printing plates one at a time into an aligned one of said workholding means of said workholder when said workholder is disposed in said predetermined loading position, means for ejecting a printing plate from another one of said workholding means when said workholder is disposed in said loading position, and indexing means for imparting indexing movement to said workholder and including a plurality of eccentrically located abutments on said workholder allocated to the respective workholding positions and means for engaging one of said abutments in a return movement of said carriage to effect such indexing movement.

20. In an embossing machine having a plurality of settable pairs of punches and dies adapted to be moved selectively into an embossing position, a carriage mounted for reciprocating movement past said embossing position, a cross slide mounted on said carriage for line spacing movement in a direction transverse to the direction of the reciprocation of said carriage, a rotatable workholder comprising a circular plate mounted on said cross slide for rotation about an axis that is perpendicular to the paths of both said cross slide and said carriage, said rotatable plate having a plurality of elongated openings formed therein adjacent to the periphery thereof and defining a plurality of equally spaced workholding positions in each of which a printing plate may be mounted so as to be disposed over the opening that defines such position, workholding means disposed along the opposite side edges of said openings for holding such printing plates in said workholding positions, means acting between said cross slide and said rotatable workholder to yieldingly hold said workholder in any one of a plurality of indexed positions, and indexing means for imparting indexing movement to said workholder.

21. In an embossing machine having a plurality of settable pairs of cooperating punches and dies adapted to be moved selectively into an embossing position, a carriage, means including a mounting rail supporting said carriage for reciprocation past said embossing position, spring means urging said carriage in a character spacing direction from an initial position toward a plate-handling position, an escapement means for controlling movement of said carriage in said character spacing direction, a cross slide mounted on said carriage for line spacing movement in a direction transverse to the direction of the reciprocation of said carriage, workholding means on said cross slide defining at least one workholding position, plate handling and moving means mounted adjacent said plate-handling position for moving a printing plate on and relative to the workholding means when said carriage is in said plate-handling position, means for operating said plate-handling means, carriage return means for returning said carriage through a return movement from any position along its path to said initial position, means including cooperating parts on said carriage and said carriage return means and operable to disengage said escapement means during such return movement of the carriage, and means including cooperating parts on said carriage and said rail and operable to engage said escapement means at the end of such return movement.

22. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a loading position, spring means urging said carriage toward said loading position in said character spacing direction, escapement means for controlling such character spacing movement of said carriage, a release element on said carriage for releasing said escapement means to enable movement of said carriage in a character spacing direction to said loading position, a cross slide mounted on said carriage for reciprocation transversely of the path of said carriage in line spacing and return directions, spring means urging said cross slide in said return direction, line spacing means on said carriage operable to impart line spacing movements to said cross slide, a release element on said carriage for releasing said line spacing means to thereby enable return movement of said cross slide, a turret having a plurality of spaced workholding stations about the periphery thereof in any one of which a printing plate may be mounted, means supporting said turret on said cross slide for indexing movement to successive indexed positions wherein different workholding stations are brought into embossing position, plate loading and unloading means at said loading position for unloading a printing plate from one station of said turret and for loading a printing plate onto another station of said turret, means including a reciprocable packer element for collecting the unloaded printing plates, drive mechanism including a constantly operated drive shaft, release means operatively connected to said release elements for releasing said line spacing means and said escapement means, and including a one-revolution carriage release clutch operatively associated with said drive shaft, a one-revolution plate feed clutch driven from said drive shaft and operatively associated with said plate loading and unloading means for operating the same, a one-revolution packer clutch driven from said drive shaft and operatively connected to said packer element for reciprocating the same, a one-revolution line spacing clutch driven from said drive shaft and operatively connected to said line spacing means for operating the same, carriage return means including a one-revolution carriage restoring clutch driven from said drive shaft and operatively related to said carriage for imparting restoring movement thereto, indexing means rendered effective by said plate loading means for imparting indexing movement to said turret, means operated by said carriage return means for rendering said indexing means ineffective after completion of an indexing movement, and means for controlling operation of said clutches.

23. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a loading position, spring means urging said carriage toward said loading position in said character spacing direction, escapement means for controlling such character spacing movement of said carriage, a release element on said carriage for releasing said escapement means to enable movement of said carriage in a character spacing direction to said loading position, a cross slide mounted on said carriage for reciprocation transversely of the path of said carriage in line spacing and return directions, spring means urging said cross slide in a return direction, line spacing means on said carriage operable to impart line spacing movements to said cross slide, a release element on said carriage for releasing said line spacing means to thereby enable return movement of said cross slide, a workholder having a plurality of spaced workholding stations thereon in any one of which a printing plate may be mounted, means supporting said workholder on said cross slide for shifting movement to successive set positions wherein different workholding stations are brought into embossing position, plate loading and unloading means at said loading position for unloading a printing plate from one station of said workholder and for loading a printing plate onto another station of said workholder, means including a reciprocable packer element for collecting the unloaded printing plates, drive mechanism including a constantly operated drive shaft, release means operatively connected to said release elements for releasing said line spacing means and said escapement means, and including a one-revolution carriage release clutch operatively associated with said drive shaft, a one-revolution plate feed clutch driven from said drive shaft and operatively associated with said plate loading and unloading means for operating the same, a one-revolution packer clutch driven from said drive shaft and operatively connected to said packer element for reciprocating the same, a one-revolution line spacing clutch driven from said drive shaft and operatively connected to said line spacing means for operating the same, a one-revolution carriage restoring clutch driven from said drive shaft and operatively related to said carriage for imparting restoring movement thereto, and shifting means for imparting shifting movement to said workholder to shift the same to different set positions.

24. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a loading position, spring means urging said carriage toward said loading position in said character spacing direction, escapement means for controlling such character spacing movement of said carriage, a release element on said carriage for releasing said escapement means to enable movement of said carriage in a character spacing direction to said loading position, a cross slide mounted on said carriage for reciprocation transversely of the path of said carriage in line spacing and return directions, spring means urging said cross slide in said return direction, line spacing means on said carriage operable to impart line spacing movements to said cross slide, a release element on said carriage for releasing said line spacing means to thereby enable return movement of said cross slide, a turret having a plurality of spaced workholding stations about the periphery thereof in any one of which a printing plate may be mounted, means supporting said turret on said cross slide for indexing movement to successive indexed positions wherein different workholding stations are brought into embossing position, plate loading and unloading means at said loading position for unloading a printing plate from one station of said turret and for loading a printing plate onto another station of said turret, means including a reciprocable packer element for collecting the unloaded printing plates, drive mechanism including a constantly operated drive shaft, release means operatively connected to said release elements for releasing said line spacing means and said escapement means, and including a one-revolution carriage release clutch operatively associated with said drive shaft, a one-revolution plate feed clutch driven from said drive shaft and operatively associated with said plate loading and unloading means for operating the same, means operated by said release means in the course of its operative cycle to initiate a one-revolution cycle of said plate feed clutch, a one-revolution packer clutch driven from said drive shaft and operatively connected to said packer element for reciprocating the same, means operated by said plate loading and unloading means in the course of its operating cycle to initiate a one-revolution cycle of said packer clutch, a one-revolution line spacing clutch driven from said drive shaft and operatively connected to said line spacing means for operating the same, carriage return means including a one-revolution carriage return clutch driven from said drive shaft and operatively related to said carriage for imparting restoring movement thereto, means operated by said carriage return means in the course of its operating cycle to initiate operation of said line spacing clutch, indexing means rendered effective by said plate loading means for imparting indexing movement to said turret, means operated by said carriage return means for rendering said indexing means ineffective after completion of an indexing movement, and means for initiating operation of said carriage release clutch and said carriage return clutch.

25. In an embossing machine having a plurality of pairs of cooperating punches and dies adapted to be moved selectively into an embossing position for the performance of a character embossing operation on a printing plate, a reciprocable carriage movable in character spacing and carriage return directions past said embossing position and between an initial position and a loading position, spring means urging said carriage toward said loading position and in said character spacing direction, escapement means for controlling such character spacing movement of said carriage, a release element on said carriage for releasing said escapement means to enable movement of said carriage in a character spacing direction to said loading position, a cross slide mounted on said carriage for reciprocation transversely of the path of said carriage in line spacing and return directions, spring means urging said cross slide in a return direction, line spacing means on said carriage operable to impart line spacing movements to said cross slide, a release element on said carriage for releasing said line spacing means to thereby enable return movement of said cross slide, a turret having a plurality of spaced workholding stations about the periphery thereof in any one of which a printing plate may be mounted, means supporting said turret on said cross slide for indexing movement to successive indexed positions wherein different workholding stations are brought into embossing position, plate loading and unloading means at said loading position for unloading a printing plate from one station of said turret and for loading a printing plate onto another station of said turret, means including a reciprocable packer element for collecting the unloaded printing plates, drive mechanism including a constantly operated drive shaft, release means operatively connected to said release elements for releasing said line spacing means and said escapement means, and including a one-revolution carriage release clutch operatively associated with said drive shaft, a one-revolution plate feed clutch driven from said drive shaft and operatively associated with said plate loading and unloading means for operating the same, a one-revolution packer clutch driven from said drive shaft and operatively connected to said packer element for reciprocating the same, a one-revolution line spacing clutch driven from said drive shaft and operatively connected to said line spacing means for operating the same, carriage return means including a one-revolution carriage return clutch driven from said drive shaft and operatively related to said carriage for imparting return movement thereto, indexing means rendered effective by said plate loading means for imparting indexing movement to said turret, means operated by said carriage return means for rendering said indexing means ineffective after completion of an indexing movement, individual means for initiating operation of said carriage release clutch and said carriage return clutch, means operable as an incident to the operation of said carriage release clutch to initiate operation of said plate feed clutch and said packer clutch in succession, and means operable as an incident to operation of said carriage return clutch to initiate operation of said line spacing clutch.

26. In an embossing machine, a stationary carriage rail, a reciprocable carriage mounted on said rail for movement in character spacing and carriage return direction past an embossing position and between an initial position and a plate-handling position, spring means urging said carriage in said character spacing direction, escapement means for controlling such character spacing movement of said carriage, a release element on said carriage including a release bail having the cross member thereof extended parallel to the carriage path and operable to release said escapement means to enable movement of said carriage in a character spacing direction to said plate-handling position, a cross slide mounted on said carriage for reciprocation transversely of the path of said carriage in line spacing and return directions, spring means urging said cross slide in a return direction, line spacing means on said carriage including a bail having a cross member extended parallel to the carriage path and operable to impart line spacing movements to said cross slide, a release element on said carriage connected to said release bail for operation thereby to release said line spacing means to thereby enable return movement of said cross slide, and workholding means on said cross slide in which a printing plate may be mounted.

27. In an embossing machine having a plurality of pairs of settable pairs of punches and dies adapted to be moved selectively into an embossing position, a plate handling unit secured in position on said machine and comprising a base plate and a carriage rail rigidly connected together to afford a frame, a carriage mounted on said rail for reciprocation from a predetermined loading position past said embossing position, a cross slide mounted on said carriage for line spacing movement in a direction transverse to the direction of the reciprocation of said carriage, a rotatable workholder mounted on said cross slide for rotation about an axis that is perpendicular to the path of both said cross slide and said carriage, said rotatable workholder having a plurality of workholding means disposed about the periphery thereof and defining a plurality of equally spaced workholding positions, means acting between said cross slide and said rotatable workholder to yieldingly hold said workholder in any one of a plurality of indexed positions, means mounted on said frame for feeding printing plates one at a time into an aligned one of said workholding means of said workholder when said workholder is disposed in said predetermined loading position, means mounted on said frame for ejecting a printing plate from another one of said workholding means when said workholder is disposed in said loading position, driving means mounted on said frame for operating said plate feeding means and said plate ejecting means while said carriage remains stationary in said loading position, normally inactive indexing means mounted on said frame for imparting indexing movement to said workholder, means operable to condition said indexing means for operation as an incident to the operation of said plate feeding means, means mounted on said frame for returning said carriage to said initial position, and means operable by said carriage return means to render said indexing means inactive at the end of a carriage return stroke.

28. In an embossing machine having a plurality of settable pairs of punches and dies adapted to be moved selectively into an embossing position, a plate handling unit secured in position on said machine and comprising a base plate and a carriage rail rigidly connected together to afford a frame, a carriage mounted on said rail for reciprocation from a predetermined loading position past said embossing position, a cross slide mounted on said carriage for line spacing movement in a direction transverse to the direction of the reciprocation of said carriage, workholding means mounted on said cross slide, means mounted on said frame for feeding printing plates one at a time into said workholding means, means mounted on said frame for ejecting a printing plate from said workholding means, driving means mounted on said frame for operating said plate feeding means and said plate ejecting means, and means mounted on said frame for returning said carriage to said initial position.

29. A plate handling unit adapted for use in an embossing machine having a plurality of pairs of settable punches and dies adapted to be moved selectively into an embossing position, said plate handling unit comprising a base plate and a carriage rail rigidly connected together to afford a frame, a carriage mounted on said rail for reciprocation from a predetermined loading position past said embossing position, a cross slide mounted on said carriage for line spacing movement in a direction transverse to the direction of the reciprocation of said carriage, workholding means mounted on said cross slide, means mounted on said frame for feeding printing plates into and out of said workholding means, driving means mounted on said frame for operating said plate feeding means, and means mounted on said frame for returning said carriage to said initial position.

30. A plate handling unit for use in an embossing machine having a plurality of pairs of settable punches and dies adapted to be moved selectively into an embossing position, said plate handling unit being adapted to be secured in position on said machine and comprising a base plate and a carriage rail rigidly connected together to afford a frame, a carriage mounted on said rail for reciprocation from a predetermined loading position past said embossing position, a cross slide mounted on said carriage for line spacing movement in a direction transverse to the direction of the reciprocation of said carriage, workholding means mounted on said cross slide, means mounted on said frame for feeding printing plates one at a time into said workholding means, means mounted on said frame for ejecting a printing plate from said workholding means, driving means mounted on said frame for operating said plate feeding means and said plate ejecting means, and power operated means mounted on said frame for returning said carriage in one direction to said initial position, and for controlling movement of said carriage in the other direction.

31. A plate handling unit for use with an embossing machine, said unit comprising a base and a carriage rail rigidly connected thereto so as to afford a frame, a reciprocable carriage mounted on said rail for movement in character spacing and carriage return directions past an embossing position and between an initial position and a plate-handling position, spring means acting between said rail and said carriage to urge said carriage in said character spacing direction, escapement means on said rail and said carriage for controlling such character spacing movement of said carriage, a release element on said carriage operable to release said escapement means to enable movement of said carriage in a character spacing direction to said plate-handling position, a cross slide mounted on said carriage for reciprocation transversely of the path of said carriage in line spacing and return directions, work holding means on said cross slide in which a printing plate may be mounted, power operated carriage release mechanism mounted on said frame and operable on said release element to release said escapement means and enable said carriage to move to plate-handling position, and power operated carriage return mechanism mounted on said frame and operable to move said carriage to said initial position and to actuate said release element to release said escapement means during such return movement.

32. In an embossing machine, a stationary carriage rail, a reciprocable carriage mounted on said rail for movement in character spacing and carriage return direction past an embossing position and between an initial position and a plate-handling position, spring means urging said carriage in said character spacing direction, escapement means for controlling such character spacing movement of said carriage, a release element on said carriage operable to release said escapement means to enable movement of said carriage in a character spacing direction to said plate-handling position, a cross slide mounted on said carriage for reciprocation transversely of the path of said carriage in line spacing and return directions, workholding means on said cross slide in which a printing plate may be mounted, power operated carriage release mechanism operable on said release element to release said escapement means and enable said carriage to move to loading position, and power operated carriage return mechanism operable to move said carriage to said initial position and to actuate said release element to release said escapement means during such return movement.

33. In an embossing machine, a stationary carriage rail, a reciprocable carriage mounted on said rail for movement in character spacing and carriage return direction past an embossing position and between an initial position and a plate-handling position, spring means urging said carriage in said character spacing direction, escapement means for controlling such character spacing movement of said carriage, a release element on said carriage including a release bail having the cross member thereof extended parallel to the carriage path and operable to release said escapement means to enable movement of said carriage in a character spacing direction to said plate-handling position, a cross slide mounted on said carriage for reciprocation transversely of the path of said carriage in line spacing and return directions, workholding means on said cross slide in which a printing plate may be mounted, carriage release means operable on the cross member of said release bail to release said escapement means, carriage return means operable yieldingly on one arm of said bail to release said escapement during a return movement of the carriage, and means acting positively on the other arm of said bail to re-engage said escapement means at the end of a return movement of the carriage.

34. In an embossing machine having a plurality of settable pairs of cooperating punches and dies adapted to be moved selectively into an embossing position, a carriage mounted for reciprocation past said embossing position, spring means urging said carriage in a character spacing direction from an initial position toward a plate-handling position, an escapement means for controlling movement of said carriage in said character spacing direction, a cross slide mounted on said carriage for line spacing movement in a direction transverse to the direction of the reciprocation of said carriage, workholding means on said cross slide defining at least one workholding position, plate-handling and moving means mounted adjacent said loading position for cooperation with the workholding means when said carriage is in said plate-handling position, means for operating said plate-handling and moving means, and means rendered effective during a plate handling and moving operation of said plate-handling means to positively hold said carriage in said plate-handling position.

35. In an embossing machine, a plurality of settable pairs of punches and dies adapted to be moved selectively into an embossing position, a carriage mounted for reciprocation from a predetermined loading position past said embossing position, spring means urging said carriage in a character spacing direction, escapement means for controlling such movement of said carriage, a cross slide mounted on said carriage for line spacing movement in a direction transverse to the direction of the reciprocation of said carriage, a rotatable workholder mounted on said cross slide for rotation about an axis that is perpendicular to the path of both said cross slide and said carriage, said rotatable workholder having a plurality of workholding means disposed about the periphery thereof and defining a plurality of equally spaced workholding positions, means acting between said cross slide and said rotatable workholder to yieldingly hold said workholder in any one of a plurality of indexed positions, means for feeding printing plates one at a time in a direction opposite to said character spacing direction into an aligned one of said workholding means of said workholder when said workholder is disposed in said predetermined loading position, means for ejecting a printing plate from another one of said workholding means when said workholder is disposed in said loading position, means for operating said plate feeding means and said plate ejecting means while said carriage remains stationary in said loading position, indexing means for imparting indexing movement to said workholder, and retaining means rendered effective by said ejecting means to hold said carriage positively in said loading position during a plate loading operation of said plate loading means.

36. In an embossing machine, a plurality of settable pairs of punches and dies adapted to be moved selectively into an embossing position, a carriage mounted for reciprocation from a predetermined loading position past said embossing position, spring means urging said carriage in a character spacing direction, escapement means for controlling such movement of said carriage, a cross slide mounted on said carriage for line spacing movement in a direction transverse to the direction of the reciprocation of said carriage, a rotatable workholder mounted on said cross slide for rotation about an axis that is perpendicular to the path of both said cross slide and said carriage, said rotatable workholder having a plurality of workholding means disposed about the periphery thereof and defining a plurality of equally spaced workholding positions, means acting between said cross slide and said rotatable workholder to yieldingly hold said workholder in any one of a plurality of indexed positions, means for feeding printing plates one at a time into an aligned one of said workholding means of said workholder when said workholder is disposed in said predetermined loading position, means for ejecting a printing plate from another one of said workholding means when said workholder is disposed in said loading position, means for operating said plate feeding means and said plate ejecting means concurrently, means operable to positively retain said carriage in said loading position during a plate loading operation, and indexing means for imparting indexing movement to said workholder.

JOHN H. GRUVER.

REFERENCES CITED

The following references are of record in the file of this patent:

UNITED STATES PATENTS

| Number | Name | Date |
|---|---|---|
| 1,893,463 | McCain | Jan. 3, 1933 |
| 2,115,455 | Chisholm | Apr. 26, 1938 |
| 2,391,777 | Gollwitzer | Dec. 25, 1945 |